United States Patent Office 3,496,217
Patented Feb. 17, 1970

3,496,217
HYDROCYANATION OF OLEFINS
William Charles Drinkard, Jr., and Robert James Kassal, Wilmington, Del., assignors to E. I. du Pont de Nemours and Company, Wilmington, Del., a corporation of Delaware
No Drawing. Continuation-in-part of applications Ser. No. 560,091, June 24, 1966, Ser. No. 591,104, and Ser. No. 591,105, Nov. 1, 1966. This application May 23, 1967, Ser. No. 640,497
Int. Cl. C07c *121/04*
U.S. Cl. 260—465.8                  26 Claims

ABSTRACT OF THE DISCLOSURE

A process for the hydrocyanation of non-conjugated ethylenically unsaturated organic compounds using certain nickel complexes such as a tetrakis (triaryl phosphite) nickel(O), as catalyst and a compound such as a chloride of any of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron, and cobalt as promoters for the reaction.

HYDROCYANATION OF OLEFINS

Cross-references to related applications

This application is a continuation-in-part of application S.N. 560,091, filed on June 24, 1966 by William Charles Drinkard, Jr. and Robert James Kassal and now abandoned; application S.N. 591,104, filed November 1, 1966 by William Charles Drinkard, Jr. and Robert James Kassal and now abandoned; application S.N. 591,105. by filed on November 1, 1966 by William Charles Drinkard, Jr. and Robert James Kassal and now abandoned.

BACKGROUND OF THE INVENTION

It is known that the addition of hydrogen cyanide to double bonds adjacent to an activating group, such as a nitrile or a carboxy group, proceeds with relative ease. However, the addition of hydrogen cyanide to non-activated double bonds proceeds only with difficulty, if at all, and normally requires the use of high pressure of about 1,000 p.s.i. or more and high temperatures in the range of 200 to 400° C. United States Patent No. 2,571,099, issued on October 16, 1951 to Paul Arthur, Jr. and Burt Carlton Pratt, discloses an improvement over this technique, which improvement involves the use of nickel carbonyl with or without the addition of a tertiary aryl phosphine or arsine. This process suffers from proceduring a relatively high percentage of undesirable polymeric products when applied to non-conjugated olefinic starting materials and a relatively poor yield in all cases. Furthermore, this process is not satisfactory for the production of adiponitrile from pentenenitriles.

Copending application Ser. No. 509,432, filed November 23, 1965 by William C. Drinkard, Jr. and Richard V. Lindsey, Jr. relates to an improvement over this process which involves the use as catalyst of selected nickel compounds.

Copending application Ser. No. 510,074, filed Nov. 26, 1965 by William C. Drinkard, Jr., relates to an improvement over these processes which involves the use of a variety of nickel compound catalysts used in conjunction with a promoter selected from the tetraalkyl ammonium and alkali metal borohydrides.

SUMMARY OF THE INVENTION

The present invention is an improvement over these processes and involves the use of certain salts as promoters for the reaction.

The present invention provides a process which produces nitriles or dinitriles from non-conjugated olefins in high yield under mild conditions, with minimal formation of polymer and minimal use of catalyst.

The process of the present invention is generally applicable to unsaturated organic compounds containing from 2 to 20 carbon atoms having at least one non-conjugated aliphatic carbon-carbon double bond. The 3-pentenenitriles and 4-pentenenitrile are especially preferred. Suitable unsaturated compounds include olefins and olefins substituted with groups which do not attack the catalyst such as cyano. These unsaturated compounds includes monoolefins containing from 2 to 20 carbons such as ethylene, propylene, butene-1, pentene-2, hexene-2, etc., (non-conjugated diolefins such as allene) and substituted compounds such as 3-pentenenitriles and 4-pentenenitrile.

The present process offers its greatest advantage over previous processes in improved catalyst life in the production of dinitriles such as adiponitrile from either 3-pentenenitrile or 4-pentenenitrile. The total number of cycles (mole ratio of product to catalyst) obtained often depends on the impurities in the system but there is a uniform improvement obtained through the use of the promoter. When the raction is run under optimum conditions, the number of cycles obtained can run well over 200. Improved yields and reaction rates are generally also obtained through the use of promoter.

The catalysts are generally zero valent nickel compounds free of carbon monoxide which may be preformed or prepared in situ and include nickel compounds containing ligands such as alkyl or aryl (either of which contain up to 18 carbon atoms) phosphines, arsines, stibines, phosphites, arsenites, stibites, and mixtures thereof.

Generally the catalysts are nickel complexes which cause the isomerization of 3-pentenenitrile to 4-pentenenitrile. These catalysts are particularly useful for the synthesis of adiponitrile and substituted adiponitriles. This property of isomerization may readily be ascertained by contacting pure 3-pentenenitrile with the catalyst in the presence of 1 mole of $H_2SO_4$ per mole of nickel followed by heating to 120° C. during 1 hour, and then analyzing for 4-pentenenitrile such as by gas chromatography using a 2-meter, ¼ inch outside diameter copper tube packed with 20 percent (by weight) tris(2-cyanoethoxypropane) on a 60–80 mesh (U.S. standard sieve size) firebrick. The adsorbant is maintained at 100° C. and the vaporizer at 150° C., and a helium flow of 75 ml./min. is used. A thermal conductively detector may be employed. The relative elution time of 4-pentenenitrile is about 30 minutes. The formation of 4-pentenenitrile may be taken as indicating that the catalyst catalyzes the isomerization of 3-pentenenitrile to 4-pentenenitrile. Preferably, at least 0.5 percent of 4-pentenenitrile should be formed. The catalysts prepared in situ may be considered as meeting this test if the nickel compound, when added together with at least a stoichiometric equivalent amount of the ligand performs as required for the preformed nickel complexes.

An especially preferred group of these nickel compounds have the general structure:

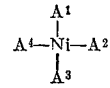

where $A^1$, $A^2$, $A^3$, and $A^4$ are neutral ligands which may be the same or different and have the formula P(XYZ) wherein X and Y are selected from the class consisting of R and OR, and Z has the formula OR, wherein the three R's may be the same or different, and wherein R is selected from the class consisting of alkyl and aryl groups containing up to 18 carbon atoms with aryl being preferred. An especially preferred class of R's are

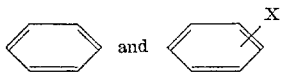

wherein X is selected from the class consisting of Cl, OCH$_3$ and CH$_3$. If desired any of the R's may be cojoined where possible. Thus the preferred neutral ligands of this group are the aryl phosphites such as triphenyl phosphite, tri (m and p-chlorophenyl) phosphite, tri (m and p-methoxyphenyl) phosphite and tri(m and p-cresyl) phosphite and mixtures thereof. Under many of the reaction conditions one or more of A$^1$, A$^2$, A$^3$ or A$^4$ may become disassociated from the nickel.

The ligands useful in forming the catalyst here may be defined as any atoms or molecules capable of functioning as a sigma-pi bonded partner in one or more coordinate bonds. A description of such ligands may be found in Advanced Inorganic Chemistry by F. Albert Cotton and G. Wilkinson, published by Interscience Publishers, a division of John Wiley & Sons, Library of Congres Catalog Card No. 62-14818; particularly on pages 602-606.

Satisfactory techniques for preparing these nickel compounds may be found in French Patent 1,297,934 granted May 28, 1962 to Messrs. Reginald Francis Clark and Charles Dean Storrs and which French patent is stated to be equivalent to U.S. Patent No. 3,328,443 issued June 27, 1967, to Reginald F. Clark and Charles D. Storrs. Other techniques for preparing these catalysts are described by J. Chatt and F. A. Hart in Chem. Soc. Journal (London), pages 1378-1389 (1960) and by Lewis S. Meriwether and Marilyn L. Fiene, JACS, 81, 4200-4209 (1959).

In many instances, it is advantageous to have an excess of certain neutral ligands present with respect to the nickel complex. The prefered excess ligands are the aryl phosphites wherein the aryl groups contain up to 18 carbon atoms. Generally, the excess ligand is present in least a two molar excess as based on the nickel present. The only limit of excess ligand involves practical considerations for it may even be used as the solvent. However, generally there is little advantage to be obtained in using over a 300 mole excess of ligand as based on one mole of nickel. The preferred triaryl phosphites for use as excess ligand are triphenyl phosphite, tri(m and p-methoxyphenyl) phosphite and tri(m and p-cresyl) phosphite, and mixtures thereof.

This use of excess ligand generally may be used to control the product distribution and hence, reduce the amount of by-products formed as well as to extend catalyst life. The excess ligand used may be the same or different from the ligand attached to nickel in the nickel compound as fed to the reactor.

There are several techniques for in situ preparation of the nickel compounds. For example, nickel carbonyl and a neutral ligand as defined above other than carbon monoxide can be added to the reaction mixture. Generally, in at least a portion of the original nickel carbonyl, all four moles of CO are replaced under reaction conditions by another ligand such as triphenyl phosphite. A second technique involves adding the neutral ligand (as defined above), a nickel (II) compound such as a nickel halide, e.g., NiCl$_2$, Ni(CN)$_2$, or bis-(acetylacetonato) nickel (II) and a source of hydride ions. Suitable sources of H$^-$ ions are compounds of the structure M'[BH$_4$]$_X$, M'[AlH$_4$]$_X$, H$_2$, and M'H$_X$ where M' is an alkali metal or an alkaline earth metal and X is a number corresponding to the valence of the metal. A third technique is to add dicyclopentadienyl nickel to a neutral ligand such as M(OR)$_3$ where M is As, P or Sb and R is aryl, to the reaction mixture. In each case, the catalyst is formed under the hydrocyanation reaction conditions hereinafter described and no other special temperatures or pressures need be observed.

The improvement to which this invention is directed involves the use of certain promoters to activate the catalyst. The promoter generally is a compound containing a cation of a metal selected from the class consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt, or mixtures thereof. Preferably the compound should be at least partially soluble in the system, and also, preferably, should not have an oxidizing tendency since this generally results in at least partial loss of the nickel catalyst.

The anion portion of the compound is preferably selected from the class consisting of halide, i.e., fluoride, chloride, bromide, and iodide; anions of lower fatty acids of from 2 to 7 carbon atoms, HPO$_3^{-2}$, H$_2$PO$_2^-$, CF$_3$COO$^-$, OSO$_2$C$_7$F$_{15}^-$ and SO$_4^-$, etc. Useful organometallic compounds include (C$_2$H$_5$)$_3$Al$_2$Cl$_3$, and $$C_2H_5AlCl_2$$

The promoter acts to improve the number of cycles and, in certain cases, the yield and rate. This is particularly evident in the hydrocyanation of 3- or 4-pentenenitrile to adiponitrile. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

The hydrocyanation reaction may be carried out by charging a reactor with all of the reactants or preferably the reactor is charged with the catalyst, or catalyst components, the unsaturated organic compound, the promoter and whatever solvent is to be used and the hydrogen cyanide gas is swept over the surface of the reaction mixture or bubbled through said reaction mixture. Another technique is to charge the reactor with the catalyst, promoter, hydrogen cyanide and whatever solvent is to be used and feeding the unsaturated compound slowly to the reaction mixture. The molar ratio of unsaturated compound to catalyst generally is varied from about 10:1 to 2000:1. In a continuous operation a much higher proportion of catalyst such as 1:5 ratio of unsaturated organic compound to catalyst may be fed to the reactor.

Preferably, the reaction medium is agitated, such as by stirring or shaking. The cyanated product can be recovered by conventional techniques such as by distillation. The reaction may be run either batchwise or in a continuous manner.

The hydrocyanation reaction can be carried out with or without a solvent. The solvent should be liquid at the reaction temperature and pressure and inert towards the unsaturated compound and the catalyst. Generally, such solvents are hydrocarbons such as benzene or xylene, or nitriles such as acetonitrile or benzonitrile. In many cases, the ligand may serve as the solvent.

Certain ethers can be added to the reaction mixture many of which ethers are solvents. These ethers act to produce an improved yield and generally higher cycles particularly in the production of adiponitrile from 3-pentenenitrile or 4-pentenenitrile. This influence is generally greatest at temperatures of from about 20 to 75° C. Up to 75 volume percent of ether is used as based on the total reaction mixture. These ethers may be cyclic or acyclic and may contain from 1 to 5 ether linkages between lower alkylene radicals or arylene radicals and in the case of acyclic ethers are capped with lower alkyl groups. These ethers include dioxane, trioxane,

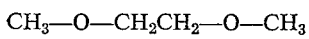
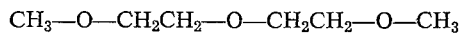

o-dimethoxybenzene, tetrahydrofuran, etc.

The exact temperature which is preferred is dependent to a certain extent on the particular catalyst being used, the particular unsaturated compound being used and the desired rate. Generally, temperatures of from −25 to 200° C. can be used with from 0 to 150° C. being preferred.

Atmospheric pressure is satisfactory for carrying out the present invention and hence pressures of from about 0.05 to 10 atmospheres are preferred due to the obvious economic considerations although pressures of from 0.05 to 100 atmospheres can be used if desired.

The nitriles formed by the present invention are useful as chemical intermediates. For instance, adiponitrile is an intermediate used in the production of hexamethylene diamine which in turn is used in the production of polyhexamethylene adipamide, a commercial polyamide useful in forming fibers, films and molded articles. Other nitriles can be used to form the corresponding acids and amines which are conventional commercial products.

Unless otherwise stated all percentages reported in the examples are by weight.

DESCRIPTION OF THE PREFERRED EMBODIMENTS

Example I

A 50 ml., three-necked, round bottom flask fitted with a reflux condenser connected to a Dry Ice trap, an inlet, and a magnetic stirrer, is set up in an oil bath maintained at 115° C. and purged with dry, deoxygenated nitrogen. The flask is charged with 0.350 g. (0.0018 mole) of $ZnHPO_3$ followed by 0.650 g. (0.0005 mole) of $Ni[P(OC_6H_5)_3]_4$, 16 g. (0.2 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. flask cooled in an ice bath. The HCN is replenished as needed. The nitrogen gas flow is adjusted to 10 ml. of nitrogen per minute to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After six and one-half hours, the reaction is shut down.

Gas chromatographic analysis indicates that 64.5 percent of the 3-pentenenitrile is converted to dinitriles and that of the 3-pentenenitrile converted, 73.2 percent is adiponitrile, 26.8 percent is 1,3-dicyanobutane and 1,2-dicyanobutane. The number of cycles (molar ratio of dicyanobutanes produced to catalyst charged) is 242.

Example II

A 50 ml., three-necked, round bottom flask fitted with a reflux condenser connected to a Dry Ice trap, an inlet, and a magnetic stirrer, is set up in an oil bath maintained at 115° C. and purged with dry, deoxygenated nitrogen. The flask is charged with 0.219 g. (0.001 mole) of $Zn(CH_3COO)_2 \cdot 2H_2O$ followed by 0.650 g. (0.0005 mole) of $Ni[P(OC_6H_5)_3]_4$, 20 g. (0.25 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. flask cooled in an ice bath. The nitrogen gas flow is adjusted to 20 ml. of nitrogen per minute to give a gaseous hydrogen cyanide feed rate equivalent to about 1.0 ml. as measured at 0° C. of liquid hydrogen cyanide per hour. The resulting mixture of gases is passed through a bed of phosphorus pentoxide to eliminate traces of moisture and then is swept across the surface of the reaction mixture in the flask. After 3 hours, the reaction is shut down.

Gas chromatographic analysis indicates that the crude product contains 16.2 percent of adiponitrile (79 percent as based on 3-pentenenitrile converted) and 4.4 percent of 1,3-dicyanobutane. The number of cycles is 92.

Example III

A 50 ml., three-necked, round bottom flask fitted with a reflux condenser connected to a Dry Ice trap, an inlet, and a magnetic stirrer, is set up in an oil bath heated to about 94° C. The flask is purged with dry, deoxygenated nitrogen and charged with 0.231 g. (0.001 mole) of $Zn[H_2PO_2]_2 \cdot 2H_2O$, followed by 0.650 g. (0.0005 mole) of $Ni[P(OC_6H_5)_3]_4$, 20 g. (0.25 mole) of 3-pentenenitrile, and 3.1 g. (0.01 mole) of $P(OC_6H_5)_3$. The temperature of the oil bath is gradually increased from 94 to 119° C. over a period of 11¼ hours, which maintains the temperature of the reaction mixture close to 110° C. for most of the reaction period. A stream of dry, deoxygenated nitrogen gas is bubbled through 10 ml. of liquid hydrogen cyanide contained in a 20 ml. flask, cooled in an ice bath. The hydrogen cyanide is replenished as needed. The nitrogen gas flow is adjusted to 10 ml. of nitrogen per minute to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 11¼ hours, the reaction is shut down.

Gas chromatographic analysis indicates that 41 percent of the 3-pentenenitrile is converted to dinitriles and that of the dinitriles recovered, 75.1 percent is adiponitrile, 21.3 percent is 1,3-dicyanobutane, and 2.7 percent is 1,2-dicyanobutane. The number of cycles is 183.

Example IV

A 50 ml., three-necked, round bottom flask fitted with a reflux condenser connected to a Dry Ice trap, an inlet, and a magnetic stirrer, is set up in an oil bath maintained at 80° C. and purged with dry, deoxygenated nitrogen. The flask is charged with 0.10 g. (0.00044 mole) of zinc bromide followed by 0.325 g. (0.00025 mole) of $Ni[P(OC_6H_5)_3]_4$, 20 g. (0.25 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. flask cooled in an ice bath. The nitrogen gas flow is adjusted to give a gaseous hydrogen cyanide feed rate equivalent to about 0.4 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 7 hours, the reaction is shut down.

Gas chromatographic analysis indicates that 25 percent of the 3-pentenenitrile is converted to dinitriles and that of the 3-pentenenitrile converted, 82 percent is adiponitrile, 15.8 percent is 1,3-dicyanobutane and 2.4 percent is 1,2-dicyanobutane. The number of cycles is 250.

Example V

A 50 ml., three-necked, round bottom flask fitted with a reflux condenser connected to a Dry Ice trap, an inlet, and a magnetic stirrer, is set up in an oil bath maintained at 90±3° C., and purged with dry, deoxygenated nitrogen. The flask is charged with 0.437 g. (0.0015 mole) of $Zn(CF_3COO)_2$ followed by 3.4 ml. (0.01 mole) of $P(OC_6H_5)_3$, 39.1 ml. (0.4 mole) of 3-pentenenitrile, and 1.40 g. (0.001 mole) of $Ni[P(OC_6H_5)_3]_4$. A stream of dry, deoxygenated nitrogen gas is bubbled through liquid hydrogen cyanide contained in a 20 ml. flask cooled in an ice bath. The hydrogen cyanide is replenished as needed. The nitrogen gas flow is adjusted to 28 ml. of nitrogen per minute. The resulting gas mixture is passed through a bed of phosphorus pentoxide to eliminate traces of moisture and then is swept across the surface of the reaction mixture in the flask. After 17 hours and 52 minutes, the reaction is shut down.

Gas chromatographic analysis indicates that 47.3 percent of the 3-pentenenitrile is converted to dinitriles and that of the dinitriles produced, 80.5 percent is adiponitrile, 15.8 percent is 1,3-dicyanobutane and 3.7 is 1,2-dicyanobutane. The number of cycles is 189.

Example VI

A 50 ml. three-necked round bottom flask fitted with a reflux condsenser connected to a Dry Ice trap, an inlet, and a magnetic stirrer, is set up in an oil bath maintained at 90° C. and purged with dry, deoxygenated nitrogen. The flask is charged with 0.300 g. (0.0008 mole) of cadmium iodide followed by 0.650 g. (0.00055 mole) of Ni[P(OC$_6$H$_5$)$_3$]$_4$, 20 g. (0.25 mole) of 3-pentenenitrile, and 3.1 g. (0.01 mole) of P(OC$_6$H$_5$)$_3$. A stream of dry, deoxygenated nitrogen gas is bubble through 10 ml. of liquid hydrogen cyanide contained in a 20 ml. flask cooled in an ice bath. The nitrogen gas flow is adjusted to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 6½ hours, the reaction is shut down.

Gas chromatographic analysis indicates that 29.6 percent of the 3-petenenitrile is converted to dinitriles and that of the 3-pentenenitrile converted, 84.3 percent is adiponitrile, 13.4 percent is 1,3-dicyanobutane and 2.2 percent is 1,2-dicyanobutane. The number of cycles is 148.

Example VII

A 50 ml. three-necked, round bottom flask fitted with a reflux condenser connected to a Dry Ice trap, an inlet, and a magnetic stirrer, is set up in an oil bath maintained at 90° C., and purged with dry, deoxygenated nitrogen. The flask is charged with 0.110 g. (0.0003 mole) of cadmium iodide followed by 0.325 g. (0.00025 mole) of Ni[P(OC$_6$H$_5$)$_3$]4, 25.0 g. (0.31 mole) of 3-pentenenitrile and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. flask cooled in an ice bath. The hydrogen cyanide is replenished as needed. The nitrogen gas flow is adjusted to 5 ml. of nitrogen per minute. The resulting gas mixture is passed through a bed of phosphorus pentoxide to eliminate traces of moisture and then is swept across the surface of the reaction mixture in the flask. After 10 hours, the reaction is shut down.

Gas chromatographic anlysis indicates that 17.8 percent of the 3-pentenenitrile is converted to dinitriles and that of the 3-pentenenitrile converted, 88.5 percent is adiponitrile, 11.6 percent is 1,3-dicyanobutane and 1,2-dicyanobutane. The number of cycles is 200.

Example VIII

A 50 ml. three-necked, round bottom flask fitted with a reflux condenser connected to a Dry Ice trap, an inlet, and a magnetic stirrer, is set up in an oil bath maintained at 90° C. and purged with dry, deoxygenated nitrogen. The flask is charged with 0.15 g. (0.0005 mole) of zinc iodide followed by 0.325 g. (0.00025 mole) of

20 g. (0.25 mole) of 3-pentenenitrile and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. flask cooled in an ice bath. The nitrogen gas flow is adjusted to 10 ml. of nitrogen per minute to give gaseous hydrogen cyanide feed rate equivalent to about 0.5 ml. (as measured at 0° C.) of liquid hydrogen cyanide per hour. The hydrogen cyanide is replenished as needed. The resulting gas mixture is passed through a bed of phosphorus pentoxide to eliminate traces of moisture and then is swept across the surface of the reaction mixture in the flask. After 12 hours, the reaction is shut down.

Gas chromatographic analysis indicates that 44.5 percent of the 3-pentenenitrile is converted to dinitriles and that of the 3-pentenenitrile converted, 83.5 percent is adiponitrile, 14.2 percent is 1,3-dicyanobutanes and 2.3 percent is 1,2-dicyanobutane. The number of cycles is 435.

Example IX

A 50 ml., three-necked round bottom flask fitted with a reflux condenser connected to a Dry Ice trap, an inlet, and a magnetic stirrer, is set up in an oil bath maintained at 80° C. and purged with dry, deoxygenated nitrogen. The flask is charged with 0.287 g. (0.001 mole) of ZnSO$_4$·7H$_2$O followed by 0.650 g. (0.0005 mole) of Ni[P(OC$_6$H$_5$)$_3$]$_4$, 20.0 g. (0.25 mole) of 3-pentenenitrile and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. flask cooled in an ice bath. The nitrogen gas flow is adjusted to 10 ml. of nitrogen per minute to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 6 hours, the reaction is shut down.

Gas chromatographic analysis indicates that 22 percent of the 3-pentenenitrile is converted to dinitriles and that of the 3-pentenenitrile converted, 79.0 percent is adiponitrile, 20.8 percent is 1,3-dicyanobutane and 0.2 percent is 1,2-dicyanobutane. The number of cycles is 110.

Example X

A mixture of 20 g. of 3-pentenenitrile, 11 g. of triphenylphosphite, 0.5 g. of anhydrous zinc chloride, and 4.5 g. of (tetrakis triphenylphosphite)nickel(O) is charged to a 3-necked, 100 ml., glass flask fitted with a gas inlet tube above the liquid level, a gas exit through a reflux condenser, and a thermometer. The system is purged with nitrogen and the mixture heated to 120° C. A stream of nitrogen gas is bubbled through liquid hydrogen cyanide and the resulting gas mixture is swept across the surface of the stirred hot catalyst mixture. A total of 9 ml. of liquid hydrogen cyanide is added over a 30 minute period.

Gas chromatographic analysis shows that the crude liquid product contains 57.3 percent adiponitrile, 14.2 percent 1,3-dicyanobutane, and 1.8 percent 1,2-dicyanobutane.

Example XI

A mixture of 20 g. of 3-pentenentrile, 11 g. of triphenylphosphite, 0.8 g. of zinc bromide and 4.5 g. of tetrakis (triphenylphosphite)nickel(O) is charged to a 100 ml. glass flask. The system is purged with nitrogen, and the reaction mixture is heated to 120° C. Hydrogen cyanide gas is swept across the surface of the stirred reaction mixture by a nitrogen carrier gas. A total of 18 ml. of liquid hydrogen cyanide is added over a 45 minute period. Gas chromatographic analysis shows that the sample contains 64.2 percent adiponitrile, 15.8 percent 1,3-dicyanobutane and 2.0 percent 1,2-dicyanobutane.

Example XII

A mixture of 20 g. of 3-pentenenitrile, 11 g. of triphenylphosphite, 0.65 g. of cadmium chloride, and 4.5 g. of tetrakis(triphenylphosphite)nickel(O) is charged to a 100 ml. glass flask. The system is purged with nitrogen and heated to 120° C. Hydrogen cyanide gas is swept across the surface of the stirred reaction mixture by a nitrogen carrier gas. A total of 9 ml. of liquid hydrogen cyanide is added over a 1 hour period.

Gas chromatographic analysis shows that the crude product contains 8.1 percent adiponitrile, 2.5 percent 1,3-dicyanobutane and 0.9 percent 1,2-dicyanobutane.

Example XIII

A mixture of 20 g. of 3-pentenenitrile, 2.0 g. of Ni[P(OC$_6$H$_5$)$_3$]$_4$, and 0.22 g. of zinc chloride is charged to a 100 ml., 3-necked glass flask fitted with a gas inlet tube above the liquid level, a gas exit through a reflux condenser, and a thermometer. The system is purged with nitrogen, and the mixture heated to 120° C. A stream of nitrogen gas is bubbled through liquid hydrogen cyanide, and the resulting gas mixture is swept across the surface of the stirred, hot mixture. A total of 9 ml of liquid hydrogen cyanide is added over a 1 hour period.

Gas chomatographic analysis shows that the crude liquid product contains 35.4 percent adiponitrile, 11.3 percent 1,3-dicyanobutane and 1.5 percent 1,2-dicyanobutane.

Example XIV

A 50 ml., three-necked, round bottom flask fitted with a reflux condenser connected to a Dry Ice trap, an inlet, and a magnetic stirrer, is set up in an oil bath maintained at 40–41° C., and purged with dry, deoxygenated nitrogen. The flask is charged with 0.0511 g. (375×10$^{-4}$ mole) of ZnCl$_2$, 14.6 ml. (0.15 mole) of 3-pentenenitrile, 14.6 ml. of dioxane (freshly dried on acidic alumina), 0.81 ml. (3×10$^{-3}$ mole) of (p—CH$_3$C$_6$H$_4$O)$_3$P and 0.440 g. (3×10$^{-4}$ mole) of Ni[(p—CH$_3$C$_6$H$_4$O)$_3$P]$_4$. A stream of dry, deoxygenated nitrogen gas is bubbled through 8.8 ml. of liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 16 hours and 35 minutes, the reaction is shut down. During this time period, 7.7 ml. of liquid hydrogen cyanide is fed to the reactor.

Gas chromatographic analysis indicates that 60.8 percent of the 3-pentenenitrile is converted and that of the 3-pentenenitrile converted, 84.5 percent is adiponitrile, 11.8 percent is 1,3-dicyanobutane, 1.01 percent is 1,2-dicyanobutane and 2.27 percent is cis- and trans-2-pentenenitrile. The number of cycles is 288.

Example XV

A 50 ml., three-necked, round bottom flask fitted with a reflux condenser connected to a Dry Ice trap, an inlet, and a magnetic stirrer, is set up in an oil bath maintained at 81–92° C., and purged with dry, deoxygenated nitrogen. The flask is charged with 0.0950 g. (7×10$^{-4}$ mole) of ZnCl$_2$, 27.4 ml. (0.28 mole) of 3-pentenenitrile, and 0.506 g. (7×10$^{-4}$ mole) of Ni[P(OC$_2$H$_5$)$_3$]$_4$. A stream of dry, deoxygenated nitrogen gas at a rate of 16 ml. per minute is bubbled through liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. The hydrogen cyanide in the flask is replenished as needed. After 2 hours and 22 minutes, the reaction is shut down.

Gas chromatographic analysis indicates that 11.7 percent of the 3-pentenenitrile is converted and that of the 3-pentenenitrile converted, 51.5 percent is adiponitrile, 13.4 percent is 1,3-dicyanobutane, and 3.2 percent is 1,2-dicyanobutane. The number of cycles is 32.2.

Example XVI

A 50 ml., three-necked, round bottom flask fitted with a reflux condenser connected to a Dry Ice trap, an inlet, and a magnetic stirrer, is set up in an oil bath maintained at 60–65° C., and purged with dry, deoxygenated nitrogen. The flask is charged with 0.049 g. (3.60×10$^{-4}$ mole) of ZnCl$_2$, 29.2 ml. (0.3 mole) of 3-pentenenitrile, 0.98 ml. (3×10$^{-3}$ mole) of (p-CH$_3$OC$_6$H$_4$O)$_3$P, and 0.498 g. (3×10$^{-4}$ mole) of Nn[p-CH$_3$OC$_6$H$_4$O)$_3$P]$_4$. A stream of dry, deoxygenated nitrogen gas is bubbled through liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 19 hours and 35 minutes, the reaction is shut down. During this time period, 4.5 ml. of liquid hydrogen cyanide is fed to the reactor.

Gas chromatographic analysis indicates that 26.4 percent of the 3-pentenenitrile is converted to dinitriles and that of the 3-pentenenitrile so converted, 80.9 percent is adiponitrile, 17.1 percent is 1,3-dicyanobutane, and 2.1 percent is 1,2-dicyanobutane. The number of cycles is 264.

Example XVII

A 50 ml., three-necked, round bottom flask fitted with a reflux condenser connected to a Dry Ice trap, an inlet, and a magnetic stirrer, is set up in an oil bath maintained at 57–60° C., and purged with dry, deoxygenated nitrogen. The flask is charged with 0.049 g. (3.60×10$^{-4}$ mole) of ZnCl$_2$, 24.3 g. (0.3 mole) of 3-pentenenitrile, 0.93 g. (3×10$^{-3}$ mole) of P(OC$_6$H$_5$)$_3$, and 0.420 g. (3×10$^{-4}$ mole) of Ni[P(OC$_6$H$_5$)$_3$]$_4$. A stream of dry, deoxygenated nitrogen gas is bubbled through 10 ml. of liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 5 hours and 5 minutes, the reaction is shunt down. During this time period, 7.0 ml. of liquid hydrogen cyanide is fed to the reactor.

Gas chromatographic analysis indicates that 25.7 percent of the 3-pentenenitrile is converted to dinitriles and that of the 3-pentenenitrile so converted, 77.3 percent is adiponitrile, 17.3 percent is 1,3-dicyanobutane, 2.5 percent is 1,2-dicyanobutane. In addition, 2.03 percent of cis- and trans-2-pentenenitrile are also formed. The number of cycles is 249.

Example XVIII

A 50 ml., three-necked, round bottom flask fitted with a reflux condenser connected to a Dry Ice trap, an inlet, and a magnetic stirrer, is set up in an oil bath maintained at 115° C., and purged with dry, deoxygenated nitrogen. The flask is charged with 0.352 g. (0.0019 mole) of

Zn[HPO$_3$]$_2$ 20 g. (0.247 mole) of 3-pentenenitrile, 3.1 g. (0.01 mole) of P(OC$_6$H$_5$)$_3$, and 0.925 g. (0.0005 mole) of Ni[P(OC$_6$H$_4$Cl)$_3$]$_4$. A stream of dry, deoxygenated nitrogen gas at a rate of 15 ml. per minute is bubbled through liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 3 hours and 50 minutes, the reaction is shut down.

Gas chromatographic analysis indicates that 17 percent of the 3-pentenenitrile is converted to dinitriles and that of the 3-pentenenitrile converted, 70.6 percent is adiponitrile. The number of cycles is 77.

Example XIX

A 50 ml., three-necked, around bottom flask fitted with a reflux condenser connected to a Dry Ice trap, an inlet, and a magnetic stirrer, is set up in an oil bath maintained at 50° C., and purged with dry, deoxygenated nitrogen. The flask is charged with 0.220 g. (0.0006 mole) of CdI$_2$, 25.0 g. (0.308 mole) of 3-pentenenitrile, 1.62 g. (0.004 mole) of P(OC$_6$H$_4$OCH$_3$)$_3$, and 0.720 g. (0.0004 mole) of Ni[P(OC$_6$H$_4$OCH$_3$)$_3$]$_4$. A stream of dry, deoxygenated nitrogen gas at a rate of 5 ml. per minute is bubbled through liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After about 6 hours, the reaction is shut down.

Gas chromatographic analysis indicates that 51.7 percent of the 3-pentenenitrile is converted to dinitriles and that of the 3-pentenenitrile so converted, 83 percent is adiponitrile, 13.7 percent is 1,3-dicyanobutane, 2.9 percent is 1,2-dicyanobutane. The number of cycles is 376.

Example XX

A 50 ml., three-necked, round bottom flask fitted with a reflux condenser connected to a Dry Ice trap, an inlet and a magnetic stirrer, is set up in an oil bath maintained at 81±3° C., and purged with dry, deoxygenated nitrogen. The flask is charged with 0.254 g. (2.6×10$^{-4}$ mole) of $Zn(OSO_2C_7F_{15})_2$ followed by 29.2 ml. (0.3 mole) of 3-pentenenitrile, 0.785 ml. (3×10$^{-3}$ mole3 of $P(OC_6H_5)_3$, and 0.420 g. (3×10$^{-4}$ mole) of $Ni[P(OC_6H_5)_3]_4$. A stream of dry, deoxygenated nitrogen gas is bubbled through liquid hydrogen cyanide contained in a 20 ml. flask cooled in an ice bath. The hydrogen cyanide is replenished as needed. The nitrogen gas flow is adjusted to 15 ml. of nitrogen per minute. The resulting gas mixture is passed through a bed of phosphorus pentoxide to eliminate traces of moisture and then is swept across the surface of the reaction mixture in the flask. After 6 hours and 40 minute, the reaction is shut down.

Gas chromatographic analysis indicates that 17.2 percent of the 3-pentenenitrile is converted to dinitriles and that of the dinitriles produced, 73.7 percent is adiponitrile, 20.7 percent is 1,3-dicyanobutane and 5.7 percent is 1,2-dicyanobutane. The number of cycles is 172.

Example XXI

Example XX is repeated using essentially the same conditions as Example XX but replacing the $$Zn(OSO_2C_7F_{15})_2$$

with 0.275 g. (2.72×10$^{-4}$ mole) of $Cd(OSO_2C_7F_{15})_2$. An 11.9 percent conversion of the 3-pentenenitrile to dinitriles is obtained and of the dinitriles produced, 79.3 percent is adiponitrile, 16.9 percent is 1,3-dicyanobutane, and 3.8 percent is 1,2-dicyanobutane. The number of cycles is 115.

Examples XXII–XXV

Examples XXII–XXV illustrate the effect of using a large molar excess of $ZnCl_2$ over the nickel catalyst. These examples use identical conditions except for the amount of $ZnCl_2$.

In each case, a 50 ml., three-necked, round bottom flask fitted with a reflux condenser connected to a dry ice trap, an inlet and a magnetic stirrer is set up in an oil bath maintained at 80–85° C., and purged with dry, deoxygenated nitrogen. The flask is charged with the zinc chloride, 14.6 ml. (0.15 mole) of 3-pentenenitrile, 7.3 ml. of dioxane (freshly dried on neutral alumina), 7.3 ml. of tri-p-cresyl phosphite and 0.110 g. (7.5×10$^{-5}$ mole) of tetrakis(tris-p-cresyl phosphite)nickel(O). A stream of dry, deoxygenated nitrogen is bubbled through liquid hydrogen cyanide contained in a 20 ml. flask cooled by an ice bath. The resulting gas mixture is passed through a bed of phosphorus pentoxide to eliminate traces of moisture and then is swept across the surface of the reaction mixture in the flask. The hydrogen cyanide in the 20 ml. flask is replenished as needed. The reaction is shut down when adsorption of hydrogen cyanide ceases.

The following table illustrates that more moles of 3-pentenenitrile are converted to dinitriles per mole of nickel as the amount of zinc chloride present is increased. The analysis of the products indicates that the yield to adiponitrile does not change appreciably.

TABLE I

| Mole ratio of $ZnCl_2$ to nickel catalyst: | Mole ratio of dinitriles produced to nickel catalyst |
|---|---|
| 2.5 | 359 |
| 5.0 | 466 |
| 10.0 | 594 |
| 20.0 | 676 |

Example XXVI

A 50 ml., three-necked, round bottom flask fitted with a reflux condenser connected to a Dry Ice trap, an inlet, and a magnetic stirrer, is set up in an oil bath maintained at 125° C., and purged with dry, deoxygenated nitrogen. The flask is charged with 0.82 ml. of a one molar solution of $(C_2H_5)_2AlCl$ in n-hexadecane [8.2×10$^{-4}$ mole $(C_2H_5)_2AlCl$], 0.82 ml. of a one molar solution of $$C_2H_5AlCl_2$$

in cyclohexane (8.2×10$^{-4}$ mole $C_2H_5AlCl_2$) followed by 3.46 ml. (1.31×10$^{-2}$ mole) of $P(OC_6H_5)_3$, 20.3 g. (0.25 mole) of 3-pentenenitrile, and 2.29 g. (1.64×10$^{-3}$ mole) of $Ni[P(OC_6H_5)_3]_4$. A stream of dry, deoxygenated nitrogen gas is bubbled through 4.0 ml. of liquid hydrogen cyanide contained in a 20 ml. receiver cooled in an ice bath. An additional 5.5 ml. of hydrogen cyanide is added to the receiver 90 minutes after start up and an additional 3.5 ml. when the reaction is restarted as set forth below. The nitrogen gas flow is adjusted to give a hydrogen cyanide feed rate of about 2 ml. (as measured at 0° C.) of liquid hydrogen cyanide per hour. The resulting gas mixture is passed through a bed of phosphorus pentoxide to eliminate traces of moisture and is swept across the surface of the reaction mixture in the flask. After 1 hour and 50 minutes, the reaction is shut down. After 15 hours and 25 minutes, the bath is reheated to 126° C. and the reaction continued for an additional 2 hours and 25 minutes after which the reaction is shut down.

Gas chromatographic analysis indicates that 49.6 percent of the 3-pentenenitrile is converted to dinitriles and that of the dinitriles produced, 62.6 percent is adiponitrile, 28.9 percent is 1,3-dicyanobutane and 8.6 percent is 1,2-dicyanobutane. The number of cycles (molar ratio of dicyanobutanes produced to catalyst charged) is 75.7.

Example XXVII

A 50 ml., three-necked, round bottom flask fitted with a reflux condenser connected to a Dry Ice trap, an inlet, and a magnetic stirrer, is set up in an oil bath maintained at 129±1° C., and purged with dry, deoxygenated nitrogen. The flask is charged with 0.219 g. (1.64×10$^{-3}$ mole) of $AlCl_3$ followed by 4.06 g. (1.31×10$^{-2}$ mole) of $P(OC_6H_5)_3$, 20.3 g. (0.25 mole) of 3-pentenenitrile and 2.29 g. (1.64×10$^{-3}$ mole) of $Ni[P(OC_6H_5)_3]_4$. A stream of dry, deoxygenated nitrogen gas is bubbled through 4.8 ml. of liquid hydrogen cyanide contained in a 20 ml. receiver cooled in an ice bath. After about 1 hour, an additional 6.5 ml. of hydrogen cyanide is charged into the receiver. The nitrogen gas flow is adjusted to 30–35 ml. of nitrogen per minute per minute to give a total hydrogen cyanide feed of 6.8 ml. (as measured at 0° C. of liquid hydrogen cyanide. The resulting gas mixture is passed through a bed of phosphorus pentoxide to eliminate traces of moisture and is swept across the surface of the reaction mixture in the flask. After 6 and one-half hours, the reaction is shut down.

Gas chromatographic analysis indicates that 31.5 percent of the 3-pentenenitrile is converted to dinitriles and that of the dinitriles produced, 65.6 percent is adiponitrile, 29.4 percent is 1,3-dicyanobutane and 4.9 percent is 1,2-dicyanobutane. The number of cycles (molar ratio of dicyanobutanes produced to catalyst charged) is 48.1.

Example XXVIII

A 50 ml., three-necked, round bottom flask fitted with a reflux condenser connected to a Dry Ice trap, an inlet, and a magnetic stirrer, is set up in an oil bath heated to 155° C., and purged with dry, deoxygenated nitrogen. The flask is charged with 0.82 ml. of a one molar solution of $(C_2H_5)_2AlCl$ in n-hexadecane, $[8.2 \times 10^{-4}$ mole $(C_2H_5)_2AlCl]$, 0.82 ml. of a one molar solution of $C_2H_5AlCl_2$ in cyclohexane ($8.2 \times 10^{-4}$ mole $C_2H_5AlCl_2$), 4.06 g. ($1.31 \times 10^{-2}$ mole) of $P(OC_6H_5)_3$, 20.3 g. (0.25 mole) of 3-pentenenitrile, and 0.28 g. ($1.64 \times 10^{-3}$ mole) of $Ni(CO)_4$ in that order. The oil bath is cooled to $132 \pm 3°$ C. over a period of 63 minutes, while carbon monoxide evolves from the reaction mixture. A stream of dry, deoxygenated nitrogen gas is bubbled through 15.2 ml. of liquid hydrogen cyanide contained in a 20 ml. receiver cooled in an ice bath. The nitrogen gas flow is adjusted to 35 ml. of nitrogen per minute to give a total hydrogen cyanide feed 9.5 ml. (as measured at 0° C.) of liquid hydrogen cyanide. The resulting gas mixture is passed through a bed of phosphorus pentoxide to eliminate traces of moisture and is swept across the surface of the reaction mixture in the flask. After 4 hours and 7 minutes, the reaction is shut down.

Gas chromatographic analysis indicates that 36.5 percent of the 3-pentenenitrile is converted to dinitriles and that of the dinitriles produced, 44.1 percent is adiponitrile, 37.4 percent is 1,3-dicyanobutane and 18.5 percent is 1,2-dicyanobutane. The number of cycles (molar ratio of dicyanobutanes produced to catalyst charged) is 55.6.

Example XXIX

A 50 ml., three-necked, round bottom flask fitted with a reflux condenser connected to a Dry Ice trap, an inlet and a magnetic stirrer, is set up in an oil bath maintained at 107° C., and purged with dry, deoxygenated nitrogen. The flask is charged with 0.219 g. ($1.64 \times 10^{-3}$ mole) of $AlCl_3$ followed by 4.06 g. ($1.31 \times 10^{-2}$ mole) of $P(OC_6H_5)_3$, 20.3 g. (0.25 mole) of 3-pentenenitrile and 2.29 g. ($1.64 \times 10^{-3}$ mole) of $Ni[P(OC_6H_5)_3]_4$. A stream of dry, deoxygenated nitrogen gas is bubbled through liquid hydrogen cyanide contained in a 20 ml. receiver cooled in an ice bath. The nitrogen gas flow is adjusted to 38–44 ml. of nitrogen per minute to give a hydrogen cyanide feed rate of about 3 ml. (as measured at 0° C.) of liquid hydrogen cyanide per hour. The resulting gas mixture is passed through a bed of phosphorus pentoxide to eliminate traces of moisture and is swept across the surface of the reaction mixture in the flask. Fifteen minutes after start up, the temperature of the oil bath is reduced to 90–93° C. Two hours and 10 minutes after starting the hydrogen cyanide feed, the reaction is shut down.

Gas chromatographic analysis indicates that 81.6 percent of the 3-pentenenitrile is converted to dinitriles and that of the dinitriles produced 43.7 percent is adiponitrile, 41.1 percent is 1,3-dicyanobutane and 15.2 percent is 1,2-dicyanobutane. The number of cycles (molar ratio of dicyanobutanes produced to catalyst charged) is 125.

Example XXX

A 50 ml., three-necked, round bottom flask fitted with a reflux condenser connected to a Dry Ice trap, an inlet, and a magnetic stirrer, is set up in an oil bath maintained at 80° C., and purged with dry, deoxygenated nitrogen. The flask is charged with 0.450 g. (0.001 mole) of $GaI_3$ followed by 0.650 g. (0.0005 mole) of $Ni[P(OC_6H_5)_3]_4$, 20.0 g. (0.247 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. receiver cooled in an ice bath. The nitrogen gas flow is adjusted to 10 ml. of nitrogen per minute to give a hydrogen cyanide feed rate of about 0.5 ml. (as measured at 0° C.) of liquid hydrogen cyanide per hour. The resulting gas mixture is passed through a bed of phosphorus pentoxide to eliminate traces of moisture and is swept across the surface of the reaction mixture in the flask. After 6 and one-half hours, the reaction is shut down.

Gas chromatographic analysis indicates that of the dinitriles produced, 43 percent is adiponitrile, 35.3 percent is 1,3-dicyanobutane and 20.9 percent is 1,2-dicyanobutane. The number of cycles (molar ratio of dicyanobutanes produced to catalyst charged) is 84.

Example XXXI

A 50 ml., three-necked, round bottom flask fitted with a reflex condenser connected to a Dry Ice trap, an inlet, and a magnetic stirrer, is set up in an oil bath maintained at $64 \pm 2°$ C., and purged with nitrogen. The flask is charged with 0.06 g. of $InCl_3$, followed by 25 ml. of 3-pentenenitrile, 0.7 ml. of

and 0.4 g. of

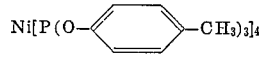

A stream of nitrogen gas is bubbled through 8.8 ml. of liquid hydrogen cyanide contained in a 20 ml. flask cooled in an ice bath. The nitrogen gas flow is adjusted to 4 ml. of nitrogen per minute. The resulting gas mixture is swept across the surface of the reaction mixture in the flask. After 3 hours and 51 minutes, the reaction is shut down.

Gas chromatographic analysis indicates that the reaction mixture contains 4.0 percent adiponitrile, 1.1 percent 1,3-dicyanobutane and 0.3 percent 1,2-dicyanobutane.

Example XXXII

A 50 ml., three-necked, round bottom flask fitted with a reflux condenser connected to a Dry Ice trap, and inlet, a thermometer, and a magnetic stirrer, is set up in an oil bath maintained at $130 \pm 2°$ C., and purged with nitrogen. The flask is charged with 0.18 ml. ($1.64 \times 10^{-3}$ mole) of liquid titanium tetrachloride followed by 4.06 g. ($1.32 \times 10^{-2}$ mole) of $P(OC_6H_5)_3$, 20.3 g. (0.25 mole) of 3-pentenenitrile, and 2.29 g. ($1.64 \times 10^{-3}$ mole) of $Ni[POC_6H_5)_3]_4$. A stream of nitrogen gas is bubbled through liquid hydrogen cyanide contained in a 20 ml. flask cooled in an ice bath. The nitrogen gas flow is adjusted to 38 ml. of nitrogen per minute to give a total hydrogen cyanide feed of 9 ml. (as measured at 0° C.) of liquid hydrogen cyanide. The resulting gas mixture is swept across the surface of the reaction mixture in the flask. After 3 hours and 13 minutes, the reaction is shut down.

Gas chromatographic analysis indicates that 15.8 percent of the 3-pentenenitrile is converted to dinitriles and that of 3-pentenenitrile so converted, 78.0 percent is adiponitrile, 16.7 percent is 1,3-dicyanobutane and 5.3 percent is 1,2-dicyanobutane. The number of cycles (mole ratio of dicyanobutanes produced to catalyst charged) is 24.3.

Example XXXIII

A 50 ml., three-necked, round bottom flask fitted with a reflux condenser connected to a Dry Ice trap, an inlet, a thermometer, and a magnetic stirrer, is set up in an oil bath maintained at $65 \pm 2°$ C., and purged with nitrogen. The flask is charged with 0.21 g. ($4.5 \times 10^{-4}$ mole) of $Zr(C_5H_7O_2)_4$ followed by 0.81 ml. of

29.2 ml. (0.30343 mole) of 3-pentenenitrile, and 0.440 g. ($3 \times 10^{-4}$ mole) of

A stream of nitrogen gas is bubbled through liquid hydrogen cyanide contained in a 20 ml. flask cooled in an ice bath. The nitrogen gas flow is adjusted to 7 cc. of nitrogen per minute to give a total hydrogen cyanide feed of 1.2 cc. (as measured at 0° C.) of liquid hydrogen cyanide. The resulting gas mixture is swept across the surface of the reaction mixture in the flask. After 4 hours and 41 minutes, the reaction is shut down.

Gas chromatographic analysis indicates that 3.5 percent of the 3-pentenenitrile is converted to dinitriles and that of the 3-pentenenitrile so converted, 52.6 percent is adiponitrile, 31.2 percent is 1,3-dicyanobutane and 16.2 percent is 1,2-dicyanobutane. The number of cycles (mole ratio of dicyanobutanes produced to catalyst charged) is 32.9.

Example XXXIV

A 50 ml., three-necked, round bottom flask fitted with a reflux condenser connected to a Dry Ice trap, and inlet, a thermometer, and a magnetic stirrer, is set up in an oil bath maintained at 43±2° C., and purged with nitrogen. The flask is charged with 0.905 ml. of a 0.497 M solution ($4.5 \times 10^{-4}$ mole) of titanium trichloride in 3-pentenenitrile followed by 11.388 g. of 3-pentenenitrile, 14.6 ml. of $CH_3OCH_2CH_2OCH_3$, 0.902 g. of

and 0.440 g. of

A stream of nitrogen gas is bubbled through liquid hydrogen cyanide contained in a 20 ml. flask cooled in an ice bath. The nitrogen gas flow is adjusted to 3.5 ml. of nitrogen per minute to give a total hydrogen cyanide feed of 1.1 ml. (as measured at 0° C.) of liquid hydrogen cyanide. The resulting gas mixture is swept across the surface of the reaction mixture in the flask. After 12 hours and 5 minutes, the reaction is shut down.

Gas chromatographic analysis indicates that 12.4 percent of the 3-pentenenitrile is converted to dinitriles and that of the 3-pentenenitrile so converted, 90.8 percent is adiponitrile, 7.8 percent is 1,3-dicyanobutane and 1.4 percent is 1,2-dicyanobutane. The number of cycles (mole ratio of dicyanobutanes produced to catalyst charged) is 62.3.

Example XXXV

A 50 ml., three-necked, round bottom flask fitted with a reflux condenser connected to a Dry Ice trap, an inlet, a thermometer, and a magnetic stirrer, is set up in an oil bath maintained at close to 62° C. and purged with nitrogen. The flask is charged with 12.2 ml. of 3-pentenenitrile followed by 2.42 ml. of a 0.497 M solution of titanium trichloride in 3-pentenenitrile, 0.81 ml. of

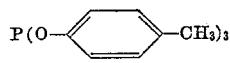

14.6 ml. of $CH_3OCH_2CH_2OCH_3$, and 0.390 g. of $Ni[P(OC_6H_5)_3]_4$. A stream of nitrogen gas is bubbled through liquid hydrogen cyanide contained in a 20 ml. flask cooled in an ice bath. The nitrogen gas flow is adjusted to 4 ml. of nitrogen per minute to give a total hydrogen cyanide feed of 3.9 ml. (as measured at 0° C.) of liquid hydrogen cyanide. The resulting gas mixture is swept across the surface of the reaction mixture in the flask. After 20 hours and 20 minutes, the reaction is shut down.

Gas chromatographic analysis indicates that 16.5 percent of the 3-pentenenitrile is converted to dinitriles and that of the 3-pentenenitrile so converted, 89.7 percent is adiponitrile, 8.8 percent, is 1,3-dicyanobutane and 1.6 percent is 1,2-dicyanobutane. The number of cycles (mole ratio of dicyanobutanes produced to catalyst charged) is 82.2. The conversion of 3-pentenenitrile to other than dinitriles or 4-pentenenitrile is 0.8 percent as based on the 3-pentenenitrile charged.

Example XXXVI

A 50 ml., three-necked, round bottom flask fitted with a reflux condenser connected to a Dry Ice trap, an inlet, a thermometer, and a magnetic stirrer, is set up in an oil bath maintained at 61±1° C., and purged with nitrogen. The flask is charged with 0.069 g. ($4.5 \times 10^{-4}$ mole) of titanium trichloride followed by 14.6 ml. (0.15 mole) of 3-pentenenitrile, 0.785 ml. ($3 \times 10^{-3}$ mole) of $P(OC_6H_5)_3$, 0.390 g. ($3.0 \times 10^{-4}$ mole) of $Ni[P(OC_6H_5)_3]_4$ and 14.6 ml. of $C_6H_4Cl_2$. A stream of nitrogen gas is bubbled through liquid hydrogen cyanide contained in a 20 ml. flask cooled in an ice bath. The nitrogen gas flow is adjusted to 5 ml. of nitrogen per minute to give a total hydrogen cyanide feed of about 5 ml. (as measured at 0° C.) of liquid hydrogen cyanide. The resulting gas mixture is swept across the surface of the reaction mixture in the flask. After 19 hours and 35 minutes, the reaction is shut down.

Gas chromatographic analysis indicates that 28.7 percent of the 3-pentenenitrile is converted to dinitriles and that of the 3-pentenenitrile so converted, 84.1 percent is adiponitrile, 12.8 percent is 1,3-dicyanobutane and 3.1 percent is 1,2-dicyanobutane. The number of cycles (mole ratio of dicyanobutanes produced to catalyst charged) is 140. There is an apparent yield loss to 2-pentenenitriles and to 2-methyl-2-butenenitriles of less than 1 percent as based on 3-pentenenitrile charged.

Example XXXVII

A 50 ml., three-necked, round bottom flask fitted with a reflux condenser connected to a Dry Ice trap, an inlet, a thermometer, and a magnetic stirrer, is set up in an oil bath maintained at 65±3° C., and purged with nitrogen. The flask is charged with 0.29 g. ($9 \times 10^{-4}$ mole) of hafnium tetrachloride followed by 29.2 ml. (0.298 mole) of 3-pentenenitrile, 1.62 ml. ($6 \times 10^{-3}$ mole) of

and 0.880 g. ($6 \times 10^{-4}$ mole) of

A stream of nitrogen gas is bubbled through liquid hydrogen cyanide contained in a 20 ml. flask cooled in an ice bath. The nitrogen gas flow is adjusted to 7 cc. of nitrogen per minute to give a total hydrogen cyanide feed of 8.4 cc. (as measured at 0° C.) of liquid hydrogen cyanide. The resulting gas mixture is swept across the surface of the reaction mixture in the flask. After 22 hours, the reaction is shut down.

Gas chromatographic analysis indicates that 4.9 percent of the 3-pentenenitrile is converted to dinitriles and that of the 3-pentenenitrile so converted, 81.6 percent is adiponitrile, 15.7 percent is 1,3-dicyanobutane and 2.7 percent is 1,2-dicyanobutane. The number of cycles (mole ratio of dicyanobutanes produced to catalyst charged) is 23.8. There is an apparent conversion to other nitriles as based on the nitriles analyzed of 0.9 percent.

Example XXXVIII

A 50 ml., three-necked, round bottom flask fitted with a reflux condenser connected to a Dry Ice trap, an inlet, a thermometer, and a magnetic stirrer, is set up in an oil bath maintained at about 45° C., and purged with nitrogen. The flask is charged with 0.105 g. ($4.5 \times 10^{-4}$ mole) of zirconium tetrachloride followed by 29.2 ml. (0.298 mole) of 3-pentenenitrile, 0.81 ml. of

and 0.440 g. ($3 \times 10^{-4}$ mole) of

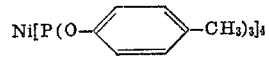

A stream of nitrogen gas is bubbled through liquid hydrogen cyanide contained in a 20 ml. flask cooled in an ice bath. The nitrogen gas flow is adjusted to about 4 ml. of nitrogen per minute to give a total hydrogen cyanide feed of 1 ml. (as measured at 0° C.) of liquid hydrogen cyanide. The resulting gas mixture is swept across the surface of the reaction mixture in the flask. After 4 hours and 57 minutes, the reaction is shut down.

Gas chromatographic analysis indicates that of the 3-pentenenitrile converted to dinitriles, 81.5 percent is adiponitrile, 17.3 percent is 1,3-dicyanobutane and 1.2 percent is 1,2-dicyanobutane. The number of cycles (mole ratio of dicyanobutanes produced to catalyst charged) is 26.5. The apparent loss of 3-pentenenitrile to 2-pentenenitriles, as based on 3-pentenenitrile charged is less than 0.2 percent.

Example XXXIX

A 50 ml. three-necked, round bottom flask fitted with a reflux condenser connected to a Dry Ice trap, an inlet, a thermometer, and a magnetic stirrer, is set up in an oil bath maintained close to 65° C., and purged with nitrogen. The flask is charged with 12.2 ml. of 3-pentenenitrile followed by 2.42 ml. of a 0.497 M solution in 3-pentenenitrile of titanium trichloride ($1.2 \times 10^{-3}$ mole) to give a total of 14.6 ml. of 3-pentenenitrile, 0.81 ml. of

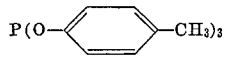

0.390 g. ($3 \times 10^{-4}$ mole) of

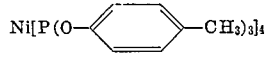

and 14.6 ml. of dioxane. A stream of nitrogen gas is bubbled through liquid hydrogen cyanide contained in a 20 ml. flask cooled in an ice bath. The nitrogen gas flow is adjusted to 4 ml. of nitrogen per minute to give a total hydrogen cyanide feed of 1.2 ml. (as measured at 0° C.) of liquid hydrogen cyanide. The resulting gas mixture is swept across the surface of the reaction mixture in the flask. After 6 hours and 15 minutes, the reaction is shut down.

Gas chromatographic analysis indicates that 21.2 percent of the 3-pentenenitrile is converted to dinitriles and that of the 3-pentenenitrile so converted, 91.15 percent is adiponitrile, 7.50 percent is 1,3-dicyanobutane and 1.35 percent is 1,2-dicyanobutane. The number of cycles (mole ratio of dicyanobutanes produced to catalyst charged) is 105. There is an apparent conversion to other nitriles as based on the nitriles analyzed of 1.6 percent.

Example XL

A 50 ml., three-necked, round bottom flask fitted with a reflux condenser connected to a Dry Ice trap, an inlet, a thermometer, and a magnetic stirrer, is set up in an oil bath maintained at 86±1° C., and purged with nitrogen. The flask is charged with 0.058 g. ($4.5 \times 10^{-4}$ mole) of $TiCl_{2.3}$ (a mixture of $TiCl_2$ and $TiCl_3$ in a ratio such that the apparent valence of the Ti is 2.3) followed by 14.6 ml. (0.15 mole) of 3-pentenenitrile, 0.785 ml. ($3 \times 10^{-3}$ mole) of $P(OC_6H_5)_3$, and 0.420 g. ($3 \times 10^{-4}$ mole) of $Ni[P(OC_6H_5)_3]_4$. A stream of nitrogen gas is bubbled through liquid hydrogen cyanide contained in a 20 ml. flask cooled in an ice bath. The nitrogen gas flow is adjusted to 12 ml. of nitrogen per minute and after 4 hours and 15 minutes is reduced to 4 ml. per minute of nitrogen to give a total hydrogen cyanide feed of 8 ml. (as measured at 0° C.) of liquid hydrogen cyanide. The resulting gas mixture is swept across the surface of the reaction mixture in the flask. After 20 hours and 35 minutes, the reaction is shut down.

Gas chromatographic analysis indicates that 32.6 percent of the 3-pentenenitrile is converted to dinitriles and that of the 3-pentenenitrile so converted, 82.7 percent is adiponitrile, 13.3 percent is 1,3-dicyanobutane and 4.0 percent is 1,2-dicyanobutane. The number of cycles (mole ratio of dicyanobutanes produced to catalyst charged) is 159. There is an apparent conversion to other nitriles as based on the nitriles analyzed of 3.2 percent.

Example XLI

A 50 ml., three-necked, round bottom flask fitted with a reflux condenser connected to a Dry Ice trap, an inlet, a thermometer, and a magnetic stirrer, is set up in an oil bath maintained at about 86° C., and purged with nitrogen. The flask is charged with 0.108 g. ($7 \times 10^{-4}$ mole) of titanium trichloride followed by 27.4 ml. (0.28 mole) of 3-pentenenitrile, and 0.506 g. ($7 \times 10^{-4}$ mole) of Ni$[P(OC_2H_5)_3]_4$. A stream of nitrogen gas is bubbled through liquid hydrogen cyanide contained in a 20 ml. flask cooled in an ice bath. The nitrogen gas flow is adjusted to 12 ml. of nitrogen per minute to give a total hydrogen cyanide feed of 1.9 ml. (as measured at 0° C.) of liquid hydrogen cyanide. The resulting gas mixture is swept across the surface of the reaction mixture in the flask. After 2 hours and 55 minutes, the reaction is shut down.

Gas chromatographic analysis indicates that 6.6 percent of the 3-pentenenitrile is converted to dinitriles and that of the 3-pentenenitrile so converted, 84.6 percent is adiponitrile, 10.9 percent is 1,3-dicyanobutane and 4.6 percent is 1,2-dicyanobutane. The number of cycles (mole ratio of dicyanobutanes produced to catalyst charged) is 26.4. There is an apparent conversion to other nitriles as based on the nitriles analyzed of 3.4 percent.

Example XLII

A 50 ml., three-necked, round bottom flask fitted with a reflux condenser connected to a Dry Ice trap, an inlet, a thermometer, and a magnetic stirrer, is set up in an oil bath maintained at 44±2° C., and purged with nitrogen. The flask is charged with 0.092 g. ($6 \times 10^{-4}$ mole) of titanium trichloride followed by 1.20 g. ($3 \times 10^{-3}$ mole) of

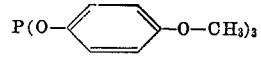

29.2 ml. (0.3 mole) of 3-pentenenitrile, and 0.498 g. ($3 \times 10^{-4}$ mole) of

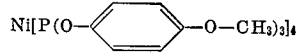

A stream of nitrogen gas is bubbled through liquid hydrogen cyanide contained in a 20 ml. flask cooled in an ice bath. The nitrogen gas flow is adjusted to 18 ml. of nitrogen per minute to give a total hydrogen cyanide feed of approximately 5.2 ml. (as measured at room temperature) of liquid hydrogen cyanide. The resulting gas mixture is swept across the surface of the reaction mixture in the flask. After 4 hours and 15 minutes, the reaction is shut down.

Gas chromatographic analysis indicates that 9.1 percent of the 3-pentenenitrile is converted to dinitriles and that of the 3-pentenenitrile so converted, 88.7 percent is adiponitrile, 8.8 percent is 1,3-dicyanobutane and 2.5 percent is 1,2-dicyanobutane. The number of cycles (mole ratio of dicyanobutanes produced to catalyst charged) is 93.2. The loss to 2-pentenenitrile is negligible.

Example XLIII

A 50 ml., three-necked, round bottom flask fitted with a reflux condenser connected to a Dry Ice trap, an inlet, a thermometer, and a magnetic stirrer, is set up in an oil bath maintained at 47±2° C., and purged with nitrogen. The flask is charged with 4.8 ml. of a 0.497 M solution in 3-pentenenitrile of titanium trichloride ($2.4 \times 10^{-3}$ mole) followed by 9.8 ml. of 3-pentenenitrile, 14.6 ml. of dioxane, 1.62 ml. (6×10⁻³ mole) of

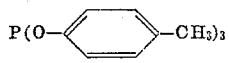

and 0.880 g. (6×10⁻⁴ mole) of

A stream of nitrogen gas is bubbled through liquid hydrogen cyanide contained in a 20 ml. flask cooled in an ice bath. The nitrogen gas flow is adjusted to 4 ml. of nitrogen per minute to give a total hydrogen cyanide feed of 6.8 ml. (as measured at 0° C.) of liquid hydrogen cyanide. The resulting gas mixture is swept across the surface of the reaction mixture in the flask. After 20 hours and 55 minutes, the reaction is shut down.

Gas chromatographic analysis indicates that 38.0 percent of the 3-pentenenitrile is converted to dinitriles and that of the 3-pentenenitrile so converted, 92.1 percent is adiponitrile, 6.7 percent is 1,3-dicyanobutane and 1.2 percent is 1,2-dicyanobutane. The number of cycles (mole ratio of dicyanobutanes produced to catalyst charged) is 93.2.

Example XLIV

A 50 ml. three-necked, round bottom flask fitted with a reflux condenser connected to a Dry Ice trap, an inlet, a thermometer, and a magnetic stirrer, is set up in an oil bath maintained at 40±1° C., and purged with nitrogen. The flask is charged with 0.058 g. (4.5×10⁻⁴ mole) of TiCl₂.₃ followed by 14.6 ml. (0.15 mole) of 3-pentenenitrile, 14.6 ml. of dioxane, 0.81 ml. of

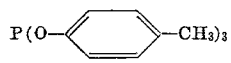

and 0.440 g. (3×10⁻⁴ mole) of

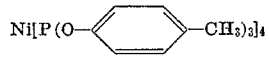

A stream of nitrogen gas is bubbled through liquid hydrogen cyanide contained in a 20 ml. flask cooled in an ice bath. The nitrogen gas flow is adjusted to 3.5 ml. of nitrogen per minute to give a total hydrogen cyanide feed of 3.7 ml. (as measured at 0° C.) of liquid hydrogen cyanide. The resulting gas mixture is swept across the surface of the reaction mixture in the flask. After 21 hours and 3 minutes, the reaction is shut down.

Gas chromatographic analysis indicates that 15.0 percent of the 3-pentenenitrile is converted to dinitriles and that of the 3-pentenenitrile so converted, 90.3 percent is adiponitrile, 8.4 percent is 1,3-dicyanobutane and 1.3 percent is 1,2-dicyanobutane. The number of cycles (mole ratio of dicyanobutanes produced to catalyst charged) is 75.5. There is an apparent conversion to other nitriles as based on the nitriles analyzed of 0.8 percent.

Example XLV

A 50 ml., three-necked round bottom flask fitted with a reflux condenser connected to a Dry Ice trap, an inlet, a thermometer, and a magnetic stirrer, is set up in an oil bath, the contents of the flask maintained at 40° C., and purged with nitrogen. The flask is charged with 2.42 ml. of a 0.497 M solution in 3-pentenenitrile of titanium trichloride (1.2×10⁻³ mole) followed by 19.5 ml. of 3-pentenenitrile, 7.3 ml. of dioxane, 0.81 ml. of

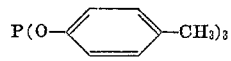

and 0.440 g. of

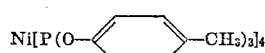

A stream of nitrogen gas is bubbled through liquid hydrogen cyanide contained in a 20 ml. flask cooled in an ice bath. The nitrogen gas flow is adjusted to 3.5 ml. of nitrogen per minute to give a total hydrogen cyanide feed of 2.8 ml. (as measured at 0° C.) of liquid hydrogen cyanide. The resulting gas mixture is swept across the surface of the reaction mixture in the flask. After 21 hours and 23 minutes, the reaction is shut down.

Gas chromatographic analysis indicates that 29.8 percent of the 3-pentenenitrile is converted to dinitriles and that of the 3-pentenenitrile so converted, 89.7 percent is adiponitrile, 8.4 percent is 1,3-dicyanobutane and 2.0 percent is 1,2-dicyanobutane. The number of cycles (mole ratio of dicyanobutanes produced to catalyst charged) is 223. There is an apparent conversion to other nitriles as based on the nitriles analyzed of 1.0 percent.

Example XLVI

A 50 ml., three-necked, round bottom flask fitted with a reflux condenser connected to a Dry Ice trap, an inlet, a thermometer, and a magnetic stirrer, is set up in an oil bath, the contents of the flask maintained at 40° C., and purged with nitrogen. The flask is charged with 2.42 ml. of a 0.497 M solution in 3-pentenenitrile of titanium trichloride followed by 12.2 ml. of 3-pentenenitrile, 14.6 ml. of 1,2-dimethoxybenzene, 0.81 ml. of

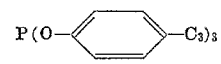

and 0.440 g. of

A stream of nitrogen gas is bubbled through liquid hydrogen cyanide contained in a 20 ml. flask cooled in an ice bath. The nitrogen gas flow is adjusted to 3.5 ml. of nitrogen per minute to give a total hydrogen cyanide feed of 4.7 ml. (as measured at 0° C.) of liquid hydrogen cyanide. The resulting gas mixture is swept across the surface of the reaction mixture in the flask. After 26 hours and 20 minutes, the reaction is shut down.

Gas chromatographic analysis indicates that 56.5 percent of the 3-pentenenitrile is converted to dinitriles and that of the 3-pentenenitrile so converted, 87.4 percent is adiponitrile, 10.3 percent is 1,3-dicyanobutane and 2.3 percent is 1,2-dicyanobutane. The number of cycles (mole ratio of dicyanobutanes produced to catalyst charged) is 277. There is an apparent conversion to other nitriles as based on the nitriles analyzed of 0.3 percent.

Example XLVII

A 50 ml., three-necked, round bottom flask fitted with a reflux condenser connected to a Dry Ice trap, an inlet and a magnetic stirrer, is set up in an oil bath maintained at 120–132° C. and purged with dry deoxygenated nitrogen. The flask is charged with 0.312 g. (1.64×10⁻³ mole) of SnCl₂, 4.06 g. (1.31×10⁻² mole) of P(OC₆H₅)₃, and 20.3 g. (0.25 mole) of 3-pentenenitrile followed by 2.29 g. (1.64×10⁻³ mole) of Ni[P(OC₆H₅)₃]₄. A stream of dry, deoxygenated nitrogen gas is bubbled through 3.2 ml. of hydrogen cyanide contained in a 20 ml. flask cooled in an ice bath. The hydrogen cyanide is replenished as needed. The nitrogen gas flow is adjusted to 35 ml. of nitrogen gas per minute. The resulting gas mixture is swept across the surface of the reaction mixture in the flask. After 18 hours and 45 minutes, the reaction is shut down. The total amount of hydrogen cyanide fed to the reaction is 8.5 ml.

Gas chromatographic analysis indicates that 22 percent of the reaction medium at shut down is adiponitrile and that of the 3-pentenenitrile converted to dinitriles, 80 percent is adiponitrile. The number of cycles (molar ratio of dicyanobutanes produced to catalyst charged) is 45.

Example XLVIII

A 50 ml., three-necked, round bottom flask fitted with a reflux condenser connected to a Dry Ice trap, an inlet, and a magnetic stirrer is set up in an oil bath maintained at 32–43° C. and purged with dry deoxygenated nitrogen. The flask is charged with 0.0853 g. of $SnCl_2$, 12.01 g. of 3-pentenenitrile, 14.6 ml. of dioxane, 0.81 ml. of $P(OC_6H_5)_3$, followed by 0.440 g. of $Ni[P(OC_6H_5)_3]_4$. A stream of dry, deoxygenated nitrogen gas is bubbled through 8.9 ml. of hydrogen cyanide contained in a 20 ml. flask cooled in an ice bath. The resulting gas mixture is swept across the surface of the reaction mixture in the flask. After 5 hours and 41 minutes, the reaction is shut down. The total amount of hydrogen cyanide fed to the reaction medium is 3.3 ml.

Gas chromatographic analysis indicates that 11.4 percent of the 3-pentenenitrile is converted to dinitriles and that of the dinitriles produced, 81.4 percent is adiponitrile, 14.2 percent is 1,3-dicyanobutane, and 3.2 percent is 1,2-dicyanobutane. The number of cycles is 55.9.

Example XLIX

A 50 ml. three-necked, round bottom flask fitted with a reflux condenser connected to a Dry Ice trap, an inlet, and a magnetic stirrer, is set up in an oil bath maintained at 80–83° C., and purged with dry, deoxygenated nitrogen. The flask is charged with 0.071 g. ($4.5 \times 10^{-4}$ mole) of $SnF_2$, 29.2 ml. (0.3 mole) of 3-pentenenitrile, 0.785 ml. ($3 \times 10^{-3}$ mole) of $P(OC_6H_5)_3$, followed by 0.420 g. ($3 \times 10^{-4}$ mole) of $Ni[P(OC_6H_5)_3]_4$. A stream of dry, deoxygenated nitrogen gas is bubbled through 6.6 ml. of liquid hydrogen cyanide contained in a 20 ml. flask cooled in an ice bath. The nitrogen gas flow is adjusted to 4 ml. of nitrogen gas per minute. After 4 hours and 58 minutes, the reaction is shut down. The total amount of hydrogen cyanide fed to the reaction is 1.6 ml.

Gas chromatographic analysis indicates that 6 percent of the 3-pentenenitrile is converted to dinitriles and that of the dinitriles produced, 69.3 percent is adiponitrile, 22.1 percent is 1,3-dicyanobutane and 8.5 percent is 1,2-dicyanobutane. The number of cycles is 59.

In each of Examples L to LXV the same reaction conditions except without the presence of a promoter failed to produce a detectable amount of dinitriles.

Example L

A 50 ml., three-necked, glass flask is fitted with a gas inlet tube positioned for a gas sweep over the surface of the flask's contents, a thermometer, and a gas outlet through a water cooled reflux condenser. The flask is heated with an oil bath. Before charging the reagents, the entire system is purged well with purified nitrogen. Hydrogen cyanide is purified by bubbling purified nitrogen through the liquid until the volume is reduced by one-half and then distilling the remainder. The reaction flask is charged with 25 ml. of 3-pentenenitrile, 0.032 g. of $VCl_3$, 0.7 ml. of tri-p-cresylphosphite, and 0.4 g. of tetrakis (tri-p-cresylphosphite) nickel (O). The flask is placed in an oil bath to maintain a temperature of 57–64° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 6.5 hours of operation, the reaction is stopped and the crude liquid analyzed by gas chromatography. Analyses show that the sample contains 1.21 percent adiponitrile, 0.22 percent 1,3-dicyanobutane, and 0.2 percent 1,2-dicyanobutane.

Example LI

As described in Example L, 25 ml. of 3-pentenenitrile, 0.033 g. of $FeCl_3$, 0.88 g. of tri-p-cresylphosphite, and 0.4 g. of tetrakis(tri-p-cresylphosphite) nickel (O) are charged to the reaction flask. The flask is placed in an oil bath to maintain a temperature of 58–62° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped. After standing at 25° C. under nitrogen for 2 days, the mixture is heated to 57–60° C., and hydrogen cyanide addition resumed. A total of 0.2 ml. of liquid hydrogen cyanide is added over a one hour period. The addition is then stopped and the crude liquid analyzed by gas chromatography. Analyses show that the sample contains 10.29 percent adiponitrile, 2.87 percent 1,3-dicyanobutane, and 0.55 percent 1,2-dicyanobutane.

Example LII

As described in Example L, 25 ml. of 3-pentenenitrile, 0.034 g. of iron (II) chloride, 0.88 g. of tri-p-cresylphosphite, and 0.4 g. of tetrakis(tri-p-cresylphosphite) nickel (O) are charged to the reaction flask. The flask is placed in an oil bath to maintain a temperature of 57–59° C., and hydrogen cyanide gas is swept across the surface of the catalyst mixture in a nitrogen carrier gas. Nitrogen flow rate is adjusted so that about 0.2 ml. of liquid hydrogencyanide is added per hour. After 4 hours of operation, the reaction is stopped. After standing at 25° C. under nitrogen for 17 hours, the mixture is heated to 58–59° C. and hydrogen cyanide addition is resumed. A total of 0.1 ml. of liquid hydrogen cyanide is added over a one hour period. The addition is then stopped and the crude liquid analyzed by gas chromatography. Analyses show that the sample contains 6.81 percent adiponitrile, 1.61 percent 1,3-dicyanobutane, and 0.25 percent 1,2-dicyanobutane.

Example LIII

As described in Example L, 25 ml. of 3-pentenenitrile, 0.034 g. of $MnCl_2$, 0.88 g. of tri-p-cresylphosphite, and 0.4 g. of tetrakis(tri-p-cresylphosphite) nickel (O) are charged to the reaction flask. The flask is placed in an oil bath to maintain a temperature of 57–61° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 4.5 hours of operation, the reaction is stopped and the crude liquid product is analyzed by gas chromatography. Analyses show that the sample contains 2.01 percent adiponitrile, 0.53 percent 1,3-dicyanobutane, and 0.25 percent 1,2-dicyanobutane.

Example LIV

As described in Example L, 25 ml. of 3-pentenenitrile, 0.043 g. of chromium (III) chloride, 0.7 ml. of tri-p-cresylphosphite and 0.4 ml. of tetrakis(tri-p-cresylphosphite) nickel (O) are charged to the reaction flask. The flask is placed in an oil bath to maintain a temperature of 57–59° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 4 hours of operation, the reaction is stopped and the crude liquid product is analyzed by gas chromatography. Analyses show that sample contains 2.66 percent adiponitrile, 0.35 percent 1,3-dicyanobutane, and 0.07 percent 1,2-dicyanobutane.

Example LV

As described in Example L, 20.66 g. of 3-pentenenitrile, 0.035 g. of cobalt (II) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 59–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped and the crude liquid product is analyzed by gas chromatography. Analyses show that the sample contains 12.47 percent adiponitrile, 2.90 percent 1,3-dicyanobutane, 0.61 percent 1,2-dicyanobutane.

Example LVI

As described in Example L, 20.93 g. of 3-pentenenitrile, 0.063 g. of zirconium (IV) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 58–59° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3 hours of operation, the reaction is stopped and the crude liquid is analyzed by gas chromatography. Analyses show that the sample contains 0.9 percent adiponitrile, 0.21 percent 1,3-dicyanobutane, and 0.06 percent 1,2-dicyanobutane.

Example LVII

As described in Example L, 25 ml. of 3-pentenenitrile, 0.041 g. of scandium (III) chloride, 0.7 ml. of tri-p-cresylphosphite, and 0.4 g. of tetrakis(tri-p-cresylphosphite) nickel (O) are added to the reaction flask. The flask is placed in an oil bath to maintain a temperature of 59° C., and hydrogen cyanide gas is swept across the surface of the catalyst mixture in a nitrogen carrier gas. Nitrogen flow rate is adjusted so that about 0.2 ml. or liquid hydrogen cyanide is added per hour. After 3.5 hours of operation, the reaction is stopped and the crude liquid is anlayzed by gas chromatography. Analyses show that the sample contains 1.30 percent adiponitrile, 0.23 percent 1,3-dicyanobutane, and 0.22 percent 1,2-dicyanobutane.

Example LVIII

As described in Example L, 25 ml. of 3-pentenenitrile, 0.051 g. of tin (II) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 58–59° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped and the crude liquid is analyzed by gas chromatography. Analyses show that the sample contains 12.27 percent adiponitrile, 2.94 percent 1,3-dicyanobutane, and 0.63 percent 1,2-dicyanobutane.

Example LIX

As described in Example L, 25 ml. of 3-pentenenitrile, 0.048 g. of palladium (II) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 58–60° C., and hydrogen cyanide gas is swept across the surface of the catalyst mixture in a nitrogen carrier gas. Nitrogen flow rate is adjusted so that about 0.2 ml. or liquid hydrogen cyanide is added per hour. After 3.5 hours of operation, the reaction is stopped and the crude liquid is analyzed by gas chromatography. Analyses show that the sample contains 0.30 percent adiponitrile, 0.04 percent 1,3-dicyanobutane, and 0.12 percent 1,2-dicyanobutane.

Example LX

As described in Example L, 25 ml. of 3-pentenenitrile, 0.055 g. of bis-acetonitrile dichlorochromium (II), 0.7 ml. of tri-p-cresylphosphite, and 0.4 g. of tetrakis (tri-p-cresylphosphite) nickel (O) are charged to the reaction flask. The flask is placed in an oil bath to maintain a temperature of 56–65° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3 hours of operation, the reaction is stopped and the crude liquid is analyzed by gas chromatography. Analyses show that the sample contains 12.17 percent adiponitrile, 2.67 percent 1,3-dicyanobutane, and 0.48 percent 1,2-dicyanobutane.

Example LXI

As described in Example L, 25 ml. of 3-pentenenitrile, 0.10 g. of thorium (IV) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 59–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3 hours and 40 minutes of operation, the reaction is stopped and the crude liquid is analyzed by gas chromatography. Analyses show that the sample contains 0.77 percent adiponitrile, 0.01 percent 1,3-dicyanobutane, and 0.01 percent 1,2-dicyanobutane.

Example LXII

As described in Example L, 25 ml. of 3-pentenenitrile, 0.047 g. of gallium (III) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 58–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped and the crude liquid is analyzed by gas chromatography. Analyses show that the sample contains 3.73 percent adiponitrile, 3.00 percent 1,3-dicyanobutane, and 2.17 percent 1,2-dicyanobutane.

Example LXIII

As described in Example L, 25 ml. of 3-pentenenitrile, 0.079 g. of rhenium (III) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 55–65° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 4 hours of operation, the reaction is stopped and the crude liquid is analyzed by gas chromatography. Analyses show that the sample contains 0.82 percent adiponitrile, 0.19 percent 1,3-dicyanobutane and 0.11 percent 1,2-dicyanobutane.

Example LXIV

As described in Example L, 25 ml. of 3-pentenenitrile, 0.1 g. of tris(tetrahydrofuran) trichlorochromium (III), 0.7 ml. of tri-p-cresylphosphite, and 0.4 g. of tetrakis(tri-p-cresylphosphite) nickel (O) are charged to the reaction flask. The flask is placed in an oil bath to maintain a temperature of 41–42° C., and hydrogen cyanide gas is swept across the surface of the catalyst mixture in a nitrogen carrier gas. Nitrogen flow rate is adqusted so that about 0.2 ml. of liquid hydrogen cyanide is added per hour. After 5.5 hours of operation, the reaction is stopped and the crude liquid is analyzed by gas chromatography. Analyses show that the sample contains 11.63 pecent adiponitrile, 1.5 percent 1,3-dicyanobutane, and 0.34 percent 1,2-dicyanobutane.

Example LXV

As described in Example L, 15.1 g. of 3-pentenenitrile, 5.0 g. of tetrahydrofuran, 0.4 g. of tris(tetrahydrofuran) trichlorochromium (III), 1.4 ml. of tri-p-cresylphosphite, and 0.8 g. of tetrakis(tri-p-cresylphosphite) nickel (O) are charged to the reaction flask. The flask is placed in an oil bath to maintain a temperature of 41–43° C. and hydrogen cyanide gas is swept across the surface of the catalyst mixture in a nitrogen carrier gas. Nitrogen flow rate is adjusted so that about 0.2 ml. of liquid hydrogen cyanide is added per hour. After 46 hours of operation, the reaction is stopped and the crude liquid is analyzed by gas chromatography. Analyses show that the sample contains 60.81 percent adiponitrile, 5.51 percent 1,3-dicyanobutane, and 1.40 percent 1,2-dicyanobutane.

Example LXVI

As described in Example XXXI, 25 ml. of 3-pentenenitrile, 0.4 g. of tetrakis (tri-p-cresylphosphite) nickel (O), 0.05 g. of tungsten (V) chloride, and 0.7 ml of tri-p-cresylphosphite are charged to the reaction flask. The flask is placed in an oil bath to maintain a temperature of 57–59° C, and hydrogen cyanide gas a swept across the surface of the catalyst mixture in a nitrogen carrier gas. Nitrogen flow rate is adjusted so that about 0.2 ml. of liquid hydrogen cyanide is added per hour. After about 5 hours of operation, the reaction is stopped and the crude liquid is analyzed by gas chromatography. Analyses show that the sample contains 1.22 per cent adiponitrile, 0.29 percent 1,3-dicyanobutane, and 0.14 percent 1,2-dicyanobutane.

Example LXVII

As described in Example XXXI, 25 ml. of 3-pentenenitrile, 0.4 g. of tetrakis (tri-p-cresylphosphite) nickel (O), and 0.036 g. of aluminum (III) chloride are charged to the reaction flask. The flask is placed in an oil bath to maintain a temperature of 57° C, and hydrogen cyanide gas is swept across the surface of the catalyst mixture in a nitrogen carrier gas. Nitrogen flow rate is adjusted so that about 0.2 ml. of liquid hydrogen cyanide is added per hour. After about 20.5 hours of operation, the reaction is stopped and the crude liquid is analyzed by gas chromatography. Analyses show that the sample contains 6.48 percent adiponitrile, 7.67 percent 1,3-dicyanobutane, and 2.42 percent 1,2-dicyanobutane.

Example LXVIII

As described in Example XXXI, 25 ml. of 3-pentenenitrile, 0.4 g. of tetrakis (tri-p-cresylphosphite) nickel (O), and 0.051 g. of tin (II) chloride are charged to the reaction flask. The flask is placed in an oil bath to maintain a temperature of 56–57° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After about 20 hours of operation, the reaction is stopped and the crude liquid is analyzed by gas chromatography. Analyses show that the sample contains 9.68 percent adiponitrile, 3.16 percent 1,3-dicyanobutane, and 0.66 percent 1,2-dicyanobutane.

Example LXIX

As described in Example XXXI, 25 ml. of 3-pentenenitrile, 0.4 g. of tetrakis (tri-p-cresylphosphite) nickel (O), 0.078 g. of germanium (IV) iodide, and 0.7 ml. of tri-p-cresylphosphite are charged to the reaction flask. The flask is placed in an oil bath to maintain a temperature of 59–61° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After about 3.5 hours of operation, the reaction is stopped and the crude liquid is analyzed by gas chromatography. Analyses show that the sample contains 0.44 percent adiponitrile, 0.04 percent 1,3-dicyanobutane, and a trace of 1,2-dicyanobutane.

Example LXX

As described in Example XXXI, 25 ml. of 3-pentenenitrile, 0.4 g. of tetrakis (tri-p-cresylphosphite) nickel (O), and 0.034 g. of manganese chloride are charged to the reaction flask. The flask is placed in an oil bath to maintain a temperature of 61–63° C., and a hydrogen cyanide gas is swept across the surface of the catalyst mixture in a nitrogen carrier gas. Nitrogen flow rate is adjusted so that about 0.2 ml. of liquid hydrogen cyanide is added per hour. After about 20.5 hours of operation, the reaction is stopped and the crude liquid is analyzed by gas chromatography. Analyses show that the sample contains 15.28 percent adiponitrile, 5.57 percent 1,3-dicyanobutane and 0.97 percent 1,2-dicyanobutane.

Example LXXI

A 50 ml., three-necked, round bottom flask fitted with a reflux condenser connected to a Dry Ice trap, an inlet and a magnetic stirrer is set up in an oil bath maintained at 80° C. and purged with dry, deoxygenated nitrogen. The flask is charged with 0.10 g. (.00051 mole) of AgBF$_4$ followed by 1.0 g. (.000768 mole) of Ni[P(OC$_6$H$_5$)$_3$]$_4$, 20 g. (0.247 mole) of 3-pentenenitrile and 1.91 g. (0.00616 mole) of P(OC$_6$H$_5$)$_3$. A stream of dry deoxygenated nitrogen gas is bubbled through 10 ml. of liquid hydrogen cyanide contained in a 20 ml. receiver cooled in an ice bath. The nitrogen gas flow is adjusted to 15 ml. of nitrogen per minute. The resulting gas mixture is passed through a bed of phosphorus pentoxide to eliminate traces of moisture and then is swept across the surface of the reaction mixture in the flask. After 2 hours and 18 minutes, the reaction is shut down. Gas chromatographic analysis shows that the reaction mixture contains 4.82 percent adiponitrile, 1.54 percent 1,3-dicyanobutane, and 0.24 percent 1,2-dicyanobutane. The number of cycles is 18.8.

Example LXXII

A 50 ml., three-necked, round bottom flask fitted with a reflux condenser connected to a Dry Ice trap, an inlet, and a magnetic stirrer is set up in an oil bath maintained at 82–86° C. and purged with dry deoxygenated nitrogen. The flask is charged with 0.170 g. (4.5×10$^{-4}$ mole) of ErCl$_3$·6H$_2$O, 29.2 ml. (0.3 mole) of 3-pentenenitrile, 0.78 ml. (3×10$^{-3}$ mole) of P(OC$_6$H$_5$)$_3$ followed by 0.420 g. (3×10$^{-4}$ mole) of Ni[P(OC$_6$H$_5$)$_3$]$_4$. A stream of dry, deoxygenated nitrogen gas is bubbled through 8.4 ml. of hydrogen cyanide contained in a 20 ml. flask cooled in an ice bath. The resulting gas mixture is swept across the surface of the reaction mixture in the flask. After 2 hours and 43 minutes the reaction is shut down. The total amount of hydrogen cyanide fed to the reaction medium is 1.8 ml.

Gas chromatographic analysis indicates that of the dinitriles produced 77 percent is adiponitrile. The number of cycles is 5–7.

Example LXXIII

A 50 ml., three-necked, round bottom flask fitted with a reflux condenser connected to a Dry Ice trap, an inlet, and a magnetic stirrer is set up in an oil bath maintained at 75–77° C. and purged with dry deoxygenated nitrogen. The flask is charged with two small spatulas full (about 0.1–0.2 g.) of BeCl$_2$, 39.1 ml. (0.4 mole) of 3-pentenenitrile, 3.4 ml. (1.1×10$^{-2}$ mole) of P(OC$_6$H$_5$)$_3$, followed by 1.40 (1.1×10$^{-3}$ mole) Ni[P(OC$_6$H$_5$)$_3$]$_4$. (The BeCl$_2$ was approximated rather than weighed out due to its extreme toxicity. The working surface of the spatula used measured about 1 mm. wide by 5 mm. long.) A stream of dry deoxygenated nitrogen gas is bubbled through 10.5 ml. of hydrogen cyanide contained in a 20 ml. flask cooled in an ice bath. The resulting gas mixture is swept across the surface of the reaction mixture in the flask. After 50 minutes, the flask contained approximately 3 percent adiponitrile which corresponds to a 79 percent yield of adiponitrile and 15 cycles. The total amout of hydrogen cyanide fed to the reaction medium is 1.5 ml.

Example LXXIV

A 50 ml., three-necked round bottom flask fitted with a reflux condenser connected to a Dry Ice trap, an inlet, and a magnetic stirrer is set up in an oil bath maintained at 80° C. and purged with dry deoxygenated nitrogen. The flask is charged with 0.65 g. (5×10⁻⁴ mole) of Ni[P(OC$_2$H$_5$)$_3$]$_4$, 0.2 g. MoCl$_2$, 20 g. (0.248 mole) of 3-pentenenitrile, and 3.0 g. (0.01 mole) of P(OC$_6$H$_5$)$_3$. A stream of dry deoxygenated nitrogen gas is bubbled at a rate of 15 ml. per minute through liquid hydrogen cyanide contained in a 20 ml. flask cooled in an ice bath. The resulting gas mixture is swept across the surface of the reaction mixture in the flask. The reaction is run until the catalyst appears to be dead. At this point gas chromatographic analysis indicates that the reaction mixture contains 3.26 percent of adiponitrile, 0.79 percent of 1,3-dicyanobutane and 0.36 percent of 1,2-dicyanobutane. The number of cycles is 19.

Example LXXV

Into a 50 ml. stirred glass reactor are charged 19.35 g. of a solution contaning:

0.47 g. (0.32 mmole) Ni[P(O—C$_6$H$_4$—CH$_3$)$_3$]$_4$ 0.10 g. (0.73 mmole) ZnCl$_2$ 1.35 g. (3.83 mmole) P(O—C$_6$H$_4$—CH$_3$)$_3$ 19.12 g. (236.0 mmole) 4-pentenenitrile 21.04 g. Total The reactor is blanketed with a dry nitrogen gas atmosphere and the solution heated at 80° C. An aliquot of the starting solution is analyzed for mono- and diboron products. A slow gaseous feed of hydrogen cyanide is passed over the reaction surface for 296 minutes at the rate of 1.0 ml. per hour, with aliquots being removed for analysis after 10, 15, 25, 35, 45, and 296 minutes. The weight of the final reaction mixture is 10.70 g.; the weight of aliquots removed is 8.48 g.

The analyses for the samples taken after zero and after 296 minutes are as follows:

WEIGHT PERCENT ANALYSES

| Compound | Minutes | |
|---|---|---|
| | t=0 | t=296 |
| Adiponitrile | | 44.92 |
| 1,2-dicyanobutane | | 0.84 |
| 1,3-dicyanobutane | | 10.09 |
| Cis-2-penetenenitrile | | 0.47 |
| Cis-2-methyl-2-butenenitrile | <0.12 | |
| Valeronitrile | | <0.10 |
| Trans-2-pentenenitrile | | 0.38 |
| Trans-3-pentenenitrile | | 19.95 |
| 4-pentenenitrile | 85.85 | 1.35 |
| Cis-3-pentenenitrile | | 4.10 |

The catalyst efficiency after 296 minutes is 174 cycles, based only on product left in the reactor. The value of 174 cycles does not include product dinitriles and unreacted active catalyst removed in the aliquots for analysis.

Example LXXVI

The following reagents are charged into a stirred 50 ml. flask which is held at 60° C. by controlling the temperature of the liquid which is circulated through a jacket surrounding the reactor. The flask which is closed to the atmosphere is flushed initially with dry nitrogen gas, and a continuous slow flow of nitrogen gas is maintained through the reactor at 3 millimoles per minute during the reaction. The off gas from the reactor is passed through a Dry Ice trap and then bubbled through a liquid seal of paraffin oil to the atmosphere.

5.0 g. of catalyst solution which contained:
    0.82 g. (0.56 mmole of tetrakis [tri-(p-cresyl) phosphite] nickel (O)
    4.18 g. of toluene solvent
0.12 g. (0.88 mmole) of ZnCl$_2$
2.00 g. (5.7 mmole) of tri-(p-cresyl)phosphite
19.3 g. (238 mmole) of 2-methyl-3-butenenitrile Hydrogen cyanide vapor is delivered to the vapor space in the reactor at a rate of 2 mmoles per minute for 180 minutes. The experiment is terminated while the hydrocyanation reaction is still actively proceeding.

The product removed from the reactor weights 30.3 g. and is analyzed for mono- and dinitriles by gas chromatography to contain: 0.15 percent adiponitrile, 62.9 percent 1,3-dicyanobutane, 3.94 percent 2-methyl-2-butenenitriles, and 2.22 percent 2-methyl-3-butenenitrile. The catalyst efficiency for the product of 1,3-dicyanobutane is 320 cycles.

Example LXXVII

The following reagents are charged into a stirred 50 ml. flask which is held at 40° C. by controlling the temperature of the liquid which is circulated through a jacket surrounding the reactor. The flask which is closed to the atmosphere is flushed initially with dry nitrogen gas, and a continuous slow flow of nitrogen gas is maintained through the reactor at one mmole per minute during the reaction. The off gas from the reactor is passed through a Dry Ice trap and then bubbled through a liquid seal of paraffin oil to the atmosphere.

8.61 g. of catalyst solution which contained:
    1.42 g. (0.97 mmole) of tetrakis [tri-(6-cresyl) phosphite] nickel (O)
    7.19 g. of toluene solvent
.19 g. (1.0 mmoles) of SnCl$_2$
5.60 g. (15.9 mmoles) of tri-(-p-cresyl) phosphite Both hydrogen cyanide and 4-pentenenitrile are fed continuously to the reactor during the reaction period. The flow of hydrogen cyanide is started several minutes before the 4-pentenenitrile in order to insure excess hydrogen cyanide is present in the reactor. Hydrogen cyanide vapor is delivered to the vapor space in the reactor at a rate of 0.75 mmole per minute, and liquid 4-pentenenitrile is delivered into the reaction mixture at a rate of 0.50 mmole per minute. After feeding 4-pentenenitrile for 260 minutes the experiment is terminated while the hydrocyanation reaction is still actively proceeding.

Nine small samples are withdrawn at intervals from the reaction mixture and analyzed for mono- and dinitriles by gas chromatography. The total weight of these samples is approximately 0.9 g. The final product recovered from the reactor weighed 26.1 g. and had the following composition based on gas chromatographic analysis: adiponitrile 36.9 percent, 1,2-dicyanobutane 0.11 percent, 1,3-dicyanobutane 6.06 percent, trans-3-pentenenitrile 0.80 percent, 4-pentenenitrile 0.09 percent, and cis-3-pentenenitrile 0.86 percent. The catalyst efficiency to total dinitriles based on the initial charge of nickel is 105 cycles.

Example LXXVIII

A 100 ml., three-necked, round bottom flask fitted with a reflux condenser connected to a Dry Ice trap, an inlet, a thermometer, and a magnetic stirrer, is set up in an oil bath, and purged with nitrogen. The flask is charged with 5.15 g. (0.015 mole) of P(OC$_6$H$_5$)$_3$, 52.0 g. (0.500 mole) of styrene, 6.50 g. (0.005 mole) of

Ni[P(OC$_6$H$_5$)$_3$]$_4$ 0.68 g. (0.005 mole) of zinc chloride and 50 ml. of methyl cyanide. The contents of the flask are maintained at 86.5–88° C. during the reaction. A stream of nitrogen gas is bubbled through liquid hydrogen cyanide contained in a flask cooled in a water bath at ambient temperature. The resulting gas mixture is swept across the surface of the reaction mixture in the flask. After 1 hour and 3 minutes the reaction is shut down. The total amount of hydrogen cyanide fed to the reaction mixture is about 5.5 ml.

Gas chromatographic analysis indicates that 3.5 percent of the styrene charged is converted to

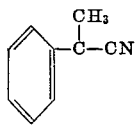

and 4.1 percent is converted to

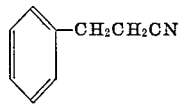

Example LXXIX

A 100 ml., three-necked, round bottom flask fitted with a reflux condenser connected to a Dry Ice trap, an inlet, a thermometer, and a magnetic stirrer is set up in an oil bath maintained at 104° C. and purged with nitrogen. The flask is charged with 1.03 g. (0.003 mole) of $P(OC_6H_5)_3$, 8.22 g. (0.100 mole) of cyclohexene, 1.30 g. (0.001 mole) of $Ni[P(OC_6H_5)_3]_4$, 0.70 g. (0.005 mole) of zinc chloride, and 10 ml. of methyl cyanide. A stream of nitrogen gas is bubbled through 24.7 ml. of liquid hydrogen cyanide contained in a flask, cooled in a water bath at ambient temperature at a rate of about 90 bubbles a minute (4 ml. of HCN/hr.). After 1 hour and 24 minutes the hydrogen cyanide flow is stopped for 48 minutes and then resumed for an additional 13 minutes.

Distillation yields 8.11 g. of cyclohexyl cyanide which represents a 74 percent yield as based on cyclohexene charged.

Example LXXX

A 100 ml. three-necked, round bottom flask fitted with a reflux condenser connected to a Dry Ice trap, an inlet, a thermometer, and a magnetic stirrer is set up in an oil bath and purged with nitrogen. The flask is charged with 27.93 g. (0.300 mole) of

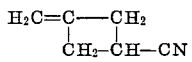

3.90 g. (0.003 mole) of $Ni[P(OC_6H_5)_3]_4$, 0.816 g. (0.006 mole) of zinc chloride and 30 ml. of methyl cyanide. The contents of the flask are maintained at 93–97° C. during the reastion. A stream of nitrogen gas is bubbled through liquid hydrogen cyanide contained in a flask cooled in a water bath at ambient temperature. The resulting gas mixture is swept across the surface of the reaction mixture in the flask. After 1 hour and 9 minutes the reaction is shut down. The total amount of hydrogen cyanide fed to the reactor is about 13 ml.

Distillation gives 21.75 g. of a fraction boiling at 90–93° C. identified as a 30% cis, 60% trans mixture of

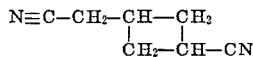

which corresponds to a 60 percent yield, based on the olefinic starting material.

Example LXXXI

A 100 ml., three-necked, round bottom flask fitted with a reflux condenser connected to a Dry Ict trap, an inlet, a thermometer and a magnetic stirrer is set up in an oil bath and purged with nitrogen. The flask is charged with 8.42 g. (0.100 mole) of hexene-1, 0.65 g. (0.005 mole) of $Ni[P(OC_6H_5)_3]_4$, 0.38 g. (0.002 mole) of stannous chloride and 10 ml. of methyl cyanide. The contents of the flask are maintained at 57–66° C. during the reaction. A stream of nitrogen gas is bubbled at a rate of about 120 bubbles per minute (about 5 ml. HCN/hr.) through liquid hydrogen cyanide contained in a flask cooled in a water bath at ambient temperature. After 1 hour and 26 minutes the reaction is shut down.

Distillation of the reaction mixture yields 4.60 g. of a fraction boiling at 54–59° C. at 8 mm. of Hg pressure. VPC separation and collection of this fraction gives two major components. The first component comprises 24 percent of the fraction and is identified as 2-cyanohexane and the second component comprises 74 percent of the fraction and is identified as 1-cyanohexane.

Example LXXXII

A 100 ml., three-necked, round bottom flask fitted with a reflux condenser connected to a Dry Ice trap, an inlet, a thermometer, and a magnetic stirrer is set up in an oil bath and purged with nitrogen. The flask is charged with 6.81 g. (0.100 mole) of cyclopentene, 1.30 g. (0.001 mole) of $Ni[P(OC_6H_5)_3]_4$, 0.760 g. (0.004 mole) of stannous chloride and 20 ml. of methyl cyanide. The contents of the flask are maintained at 47.5–58° C. during the reaction. A stream of nitrogen gas is bubbled at a rate of about 120 bubbles a minute through liquid hydrogen cyanide contained in a flask cooled in a water bath at ambient temperature. The resulting gas mixture is swept across the surface of the reaction mixture in the flask. After 1 hour and 15 minutes the reaction is shut down. Distillation of the reaction mixture provides a yield of 20 percent of cyclopentyl cyanide as based on cyclopentene charged.

Example LXXXIII

A 100 ml., three-necked, round bottom flask fitted with a reflux condenser connected to a Dry Ice trap, an inlet, a thermometer, and a magnetic stirrer is set up in an oil bath and purged with nitrogen. The flask is charged with 12.12 g. (0.100 mole) of octene-1, 1.30 g. (0.001 mole) of $Ni[P(OC_6H_5)_3]_4$, 0.760 g. (0.004 mole) of stannous chloride ad 10 ml. of methyl cyanide. The contents of the flask are maintained at 79–82° C. during the reaction. A stream of nitrogen gas is bubbled through liquid hydrogen cyanide contained in a flask cooled in a water bath at ambient temperature. The resulting gas mixture is swept across the surface of the reaction mixture in the flask. After 41 minutes the reaction is shut down. The total amount of hydrogen cyanide fed to the reactor is about 2.4 ml.

Work-up of the reaction mixture indicates a 40 percent yield of nonanenitriles of which 71 percent is 1-nonanenitrile and 23 percent is 2-nonanenitrile.

Example LXXXIV

A 100 ml., three-necked, round bottom flask fitted with a reflux condenser connected to a Dry Ice trap, an inlet, a thermometer, and a magnetic stirrer is set up in an oil bath maintained at 77° C. and purged with nitrogen. The flask is charged with 1.30 g. (0.001 mole) of

0.760 g. (0.004 mole) of stannous chloride, and 15 ml. of methyl cyanide.

Ethylene gas is fed to the flask at a rate of 550 cc. per minute during the reaction. A stream of nitrogen gas is bubbled through 29 ml. of liquid hydrogen cyanide contained in a flask cooled in a water bath at ambient temperature. The resulting gas mixture is swept across the surface of the reaction mixture. The original temperature of the contents of the flask is 64° C., which reaches 72° C. after the reaction has run 53 minutes. After 2 hours and 48 minutes the hydrogen cyanide is shut off after 10 ml. of hydrogen cyanide has been added to the flask in the oil bath. After an additional 15 minutes the hydrogen cyanide is turned on momentarily and the temperature rises 1° C. after which the reaction is shut down. The reaction mixture is distilled to obtain a 20.63 g. fraction boiling at 40–98° C. which is analyzed by NMR and found to contain 6.70 g. of propionitrile. This represents 125 cycles.

Example LXXXV

A 100 ml., three-necked, round bottom flask fitted with a reflux condenser connected to a Dry Ice trap, an inlet, a thermometer, and a magnetic stirrer is set up in an oil bath maintained at 92° C. and purged with nitrogen. The flask is charged with 9.46 g. (0.100 mole) of

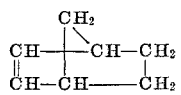

1.30 g. (0.001 mole) of Ni[P(OC$_6$H$_5$)$_3$]$_4$, 0.76 (0.004 mole) of stannous chloride and 10 ml. of methyl cyanide. A stream of nitrogen gas is bubbled through liquid hydrogen cyanide contained in a flask cooled in a water bath at ambient temperature. The resulting gas mixture is swept across the surface of the reaction mixture. The temperature of the reaction mixture at start-up is 72° C. After 58 minutes the temperature has risen to 88° C. After an additional 57 minutes the temperature falls to 72° C. and the reaction is shut down. A total of 7.5 ml. of hydrogen cyanide is fed to the reactor.

Analysis indicates a 77 percent yield of

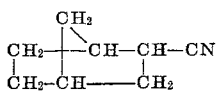

as based on the olefinic starting material.

Example LXXXVI

A 100 ml. three-necked, round bottom flask fitted with a reflux condenser, connected to a Dry Ice trap, an inlet and a magnetic stirrer is set up in an oil bath and purged with nitrogen. The flask is charged with 8.42 g. (0.100 mole) of 2-methylpentene-3, 1.30 g. (0.001 mole) of Ni[P(OC$_6$H$_5$)$_3$]$_4$, 0.76 g. (0.004 mole) of stannous chloride and 10 ml. of methyl cyanide. The contents of the flask are maintained at 51–58° C. during the reaction. A stream of nitrogen gas is bubbled at a rate of about 120 bubbles per minute through liquid hydrogen cyanide contained in a flask cooled in a water bath at ambient temperature. The resulting gas mixture is swept across the surface of the reaction mixture contained in the flask. The total amount of hydrogen cyanide fed to the reaction mixture is 5.5 ml. After 1 hour and 37 minutes the reaction is shut down.

Distillation provided a nitrile fraction equal to a 27 percent yield as based on the 2-methylpentene-3 starting material. VPC separation and collection of this nitrile fraction yielded 14 percent 2-cyano-4-methylpentane and 85 percent 1-cyano-4-methylpentane.

Example LXXXVII

A 100 ml., three-necked, round bottom flask fitted with a reflux condenser connected to a Dry Ice trap, an inlet, a thermometer, and a magnetic stirrer is set up in an oil bath. The flask is charged with 8.42 g. (0.100 mole) of 2-methylpentene-1, 1.30 g. (0.001 mole) of Ni[P(OC$_6$H$_5$)$_3$]$_4$ 0.76 g. (0.004 mole) of stannous chloride and 10 ml. of methyl cyanide. The contents of the flask are maintained at 52–58° C. during the reaction. A stream of nitrogen gas is bubbled through 41.4 ml. of liquid hydrogen cyanide contained in a flask cooled in a water bath at ambient temperature. After 18 minutes 2.4 ml. of hydrogen cyanide has been fed to the flask in the oil bath at which point the hydrogen cyanide feed is shut off and after an additional 6 minutes the reaction is shut down.

Distillation provides 9 percent (as based on the 2-methylpentene-1) methylcyanopentanes of which 53.1 percent is 1-cyano-2-methylpentane, 36.4 percent is 1-cyano-4-methylpentane, and 6.7 percent is an isomer believed to be 2-cyano-4-methylpentane.

Example LXXXVIII

A 100 ml., three-necked, round bottom flask fitted with a reflux condenser connected to a Dry Ice trap, an inlet, a thermometer, and a magnetic stirrer, is set up in an oil bath. The flask is charged with 8.42 g. (0.100 mole) of a mixture of cis and trans hexane-2, 1.30 g. (0.001 mole) of Ni[P(OC$_6$H$_5$)$_3$]$_4$, 0.76 g. (0.004 mole) of stannous chloride and 10 ml. of methyl cyanide. The contents of the flask are maintained at 56–60° C. during the reaction. A stream of nitrogen gas is bubbled through 26.4 ml. of liquid hydrogen cyanide contained in a flask cooled in a water bath at ambient temperature. The resulting gas mixture is swept across the surface of the reaction mixture in the flask. After 33 minutes 3.5 ml. of hydrogen cyanide has been fed to the flask in the oil bath. After an additional 11 minutes the reaction is shut down.

Analysis indicates the presence of 36 percent (as based on hexene-2 charged) of cyanohexanes of which 75 percent is 1-cyanohexane and 23 percent is 2-cyanohexane.

Example LXXXIX

A 100 ml. three-necked, round bottom flask fitted with a reflux condenser connected to a Dry Ice trap, an inlet, a thermometer, and a magnetic stirrer is set up in an oil bath and purged with nitrogen. The flask is charged with 6.71 g. (0.100 mole) of 1-cyanopropene-2, 1.30 g. (0.001 mole) of Ni[P(OC$_6$H$_5$)$_3$]$_4$, 0.76 g. (0.004 mole) of stannous chloride and 10 ml. of methyl cyanide. The contents of the flask are maintained at 84–94° C. during the reaction. A stream of nitrogen gas is bubbled through 16 ml. of liquid hydrogen cyanide contained in a flask cooled in a water bath at ambient temperature. The resulting gas mixture is swept across the surface of the reaction mixture in the flask. After 27 minutes 4.5 ml. of hydrogen cyanide has been fed to the flask in the oil bath. After an additional 8 minutes the reaction is shut down.

Analysis indicates a 70 percent conversion of the 1-cyanopropene-2 to a mixture of 57 percent glutaronitrile and 41 percent methylsuccinonitrile.

Example LXXXX

A 100 ml., three-necked, round bottom flask fitted with a reflux condenser connected to a Dry Ice trap, an inlet, a thermometer, and a magnetic stirrer is set up in an oil bath maintained at 100° C. and purged with nitrogen. The flask is charged with 10.71 g. (0.100 mole) of 1-cyanocyclohexene-3, 1.30 g. (0.001 mole) of Ni[P(OC$_6$H$_5$)$_3$]$_4$, 0.70 g. (0.005 mole) of zinc chloride and 10 ml. of methyl cyanide. A stream of nitrogen gas is bubbled through liquid hydrogen cyanide contained in a flask cooled in a water bath at ambient temperature. The resulting gas mixture is swept over the surface of the reaction mixture in the flask. The contents of the flask are at 86° C. at start-up, rise to 98° C. after 77 minutes and fall to 9° C. after an additional 22 minutes at which time the reaction is shut down. The total amount of hydrogen cyanide fed to the reaction mixture is 6 ml.

Analysis indicates a yield of 80 percent (as based on 1-dicyanocyclohexene-3 charged) of dinitriles of which 53 percent is trans 1,4-dicyanocyclohexane and 45 percent is unknown dinitriles.

Example LXXXXI

A 50 ml., three-necked, round bottom flask fitted with a reflux condenser connected to a Dry Ice trap, an inlet, and a magnetic stirrer is set up in an oil bath and purged with dry deoxygenated nitrogen. The flask is charged with 0.097 g. (4.5×10$^{-4}$ mole) of NbOCL$_3$, 29.2 ml. (0.3 mole) of 3-pentenenitrile, 0.785 ml. (3×10$^{-3}$ mole) of P(OC$_6$H$_5$)$_3$, and 0.420 g. (3×10$^{-4}$ mole) of Ni[P(OC$_6$H$_5$)$_3$]$_4$ The contents of the flask are maintained at 78–83° C. during the reaction. A stream of dry, deoxygenated nitrogen is bubbled through liquid hydrogen cyanide contained in a 20 ml. flask cooled in a water bath at ambient temperature. The resulting gas mixture is swept across the surface of the reaction mixture. After 1 hour and 23 minutes the reaction is shut down.

Gas chromatographic analysis indicates that the crude reaction mixture contains 1.2 percent adiponitrile.

What is claimed is:

1. A process of hydrocyanating a non-conjugated ethylenic carbon-carbon double bond in an organic compound selected from the class consisting of olefins and cyano substituted olefins which organic compound contains from 2 to 20 carbon atoms comprising contacting said organic compound with hydrogen cyanide in the presence of a compound of the structure $Ni(PXYZ)_4$ wherein X and Y are selected from the class consisting of R and OR and Z has the formula OR, wherein R is selected from the class consisting of alkyl and aryl groups of up 18 carbon atoms, and as a promoter a cation of a metal selected from the class consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron, and cobalt, which cation is present in a molar ratio of from about 1:16 to about 50:1 as based on said nickel compound, at a temperature of from —25 to 200° C. and at a pressure of from about 0.05 to 100 atmospheres, and recovering an organic cyano compound derived from said non-conjugated organic compound by addition of hydrogen cyanide to the ethylenic carbon-carbon unsaturation thereof.

2. The process of claim 1 wherein X and Y have the formula OR.

3. The process of claim 1 wherein the molar ratio of organic compound present to nickel present is from about 10:1 to 2000:1.

4. The process of claim 2 wherein the molar ratio of organic compound present to nickel present is from about 10:1 to 2000:1.

5. The process of claim 3 wherein the organic compound is selected from the class consisting of 3-pentenenitrile and 4-pentenenitrile and the principal compound recovered is adiponitrile.

6. The process of claim 4 wherein the organic compound is selected from the class consisting of 3-pentenenitrile and 4-pentenenitrile and the principal compound recovered is adiponitrile.

7. The process of claim 5 wherein the anion portion of the compound containing the metal cation is selected from the class consisting of chloride, bromide, iodide, anions of lower fatty acids of from 2 to 7 carbon atoms, $H_2PO_2^-$, $CF_3COO^-$, $OSO_2C_7F_{15}^-$, and $SO_4^{-2}$.

8. The process of claim 6 wherein the anion portion of the metal compound containing the metal cation is selected from the class consisting of chloride, bromide, iodide, anions of lower fatty acids of from 2 to 7 carbon atoms, $H_2PO_2^-$, $CF_3COO^-$, $OSO_2C_7F_{15}^-$, and $SO_4^{-2}$.

9 The process of claim 7 wherein the hydrogen cyanide is supplied to the reaction medium by bubbling it through the reactions medium or by sweeping it over the surface of the reaction mixture.

10. The process of claim 8 wherein the hydrogen cyanide is supplied to the reaction mixture by bubbling it through the reaction mixture or by sweeping it over the surface of the reaction mixture.

11. The process of claim 9 where each R is aryl.

12. The process of claim 10 wherein each R is aryl.

13. The process of claim 12 wherein R is selected from the class consisting of

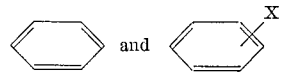

wherein X is selected from the class consisting of Cl, $OCH_3$, and $CH_3$.

14. The process of claim 13 wherein the metal cation is a cation of zinc.

15. The process of claim 13 wherein the metal cation is a cation of cadmium.

16. The process of claim 13 wherein the metal cation is a cation of titanium.

17. The process of claim 13 wherein the metal cation is a cation of tin.

18. The process of claim 13 wherein the metal cation is a cation of vanadium.

19. The process of claim 13 wherein the metal cation is a cation of chromium.

20. The process of claim 13 wherein the promoter is aluminum chloride.

21. The process of claim 14 wherein the compound containing the zinc cation is zinc chloride.

22. The process of claim 14 wherein the compound containing the zinc cation is zinc bromide.

23. The process of claim 15 wherein the compound containing the cadmium ion is cadmium bromide.

24. The process of claim 15 wherein the compound containing the cadmium ion is cadmium iodide.

25. The process of claim 16 wherein the compound containing the titanium cation is titanium trichloride.

26. The process of claim 19 wherein the compound containing chromium cation is chromium trichloride.

References Cited

UNITED STATES PATENTS

| | | | |
|---|---|---|---|
| 3,243,468 | 3/1966 | Clark et al. | 252—431 |
| 3,278,575 | 10/1966 | Davis et al. | 260—465.3 |
| 3,282,981 | 11/1966 | Davis | 260—465.3 |
| 3,297,742 | 1/1967 | Monroe et al. | 260—465.3 |
| 3,328,443 | 6/1967 | Clark et al. | 252—431 |

CHARLES B. PARKER, Primary Examiner

S. T. LAWRENCE, Assistant Examiner

U.S. Cl. X.R.

260—464, 465, 465.3, 465.9

PO-1050
(5/69)

UNITED STATES PATENT OFFICE
CERTIFICATE OF CORRECTION

Patent No. 3,496,217        Dated February 17, 1970

Inventor(s) William Charles Drinkard, Jr. & Robert James Kassal

It is certified that error appears in the above-identified patent and that said Letters Patent are hereby corrected as shown below:

Column 1, line 36; after "591,105" delete "by".

Column 3, line 45; after "in" insert "at"

* Column 7, line 43; formula should be "$Ni[P(OC_6H_5)_3]_4$".

Column 7, line 53; "anlysis" should be "analysis".

Column 10, line 30; "shunt" should be "shut".

Column 11, line 17; "($3 \times 10^{-3}$ mole 3" should be "($3 \times 10^{-3}$ mole)".

Column 14, line 42; formula should be "$Ni[P(OC_6H_5)_3]_4$".

Column 22, line 18; "drogencyanide" should be "drogen cyanide".

Column 22, line 56; after "that" insert "the".

Column 27, line 31; "boron" should be "nitrile".

Column 27, line 73; "Zncl$_2$" should be "ZnCl$_2$".

Column 28, line 5; "weights" should be "weighs".

* Column 28, line 30; "tri-(-p-cresyl) phosphite" should be "tri-(p-cresyl) phosphite".

Column 29, line 44; "reastion" should be "reaction".

Column 29, line 62; "Dry Ict" should be "Dry Ice".

Column 32, line 2; "hexane-2" should be "hexene-2".

Column 33, line 14 (Claim 1); after "up" insert "to".

Column 33, line 55 (Claim 9); "reactions" should be "reaction."

SIGNED AND
SEALED
OCT 27 1970

(SEAL)
Attest:

Edward M. Fletcher, Jr.
Attesting Officer

WILLIAM E. SCHUYLER, JR.
Commissioner of Patents